United States Patent
Kim et al.

(10) Patent No.: US 9,621,319 B2
(45) Date of Patent: Apr. 11, 2017

(54) METHOD FOR FEEDING BACK CHANNEL STATE INFORMATION IN WIRELESS COMMUNICATION SYSTEM AND APPARATUS THEREFOR

(71) Applicant: LG ELECTRONICS INC., Seoul (KR)

(72) Inventors: Hyungtae Kim, Anyang-si (KR); Illsoo Sohn, Anyang-si (KR); Jonghyun Park, Anyang-si (KR); Kijun Kim, Anyang-si (KR); Hanbyul Seo, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/401,809

(22) PCT Filed: Jun. 27, 2013

(86) PCT No.: PCT/KR2013/005705
§ 371 (c)(1),
(2) Date: Nov. 17, 2014

(87) PCT Pub. No.: WO2014/003458
PCT Pub. Date: Jan. 3, 2014

(65) Prior Publication Data
US 2015/0117355 A1    Apr. 30, 2015

Related U.S. Application Data

(60) Provisional application No. 61/665,884, filed on Jun. 28, 2012, provisional application No. 61/665,912, (Continued)

(51) Int. Cl.
*H04B 7/06* (2006.01)
*H04L 5/00* (2006.01)
(Continued)

(52) U.S. Cl.
CPC .......... *H04L 5/0053* (2013.01); *H04B 7/024* (2013.01); *H04B 7/063* (2013.01); *H04B 7/066* (2013.01);
(Continued)

(58) Field of Classification Search
CPC . H04B 10/695; H04B 7/0626; H04L 12/2692; H04L 5/0057; H04L 1/0026; H04N 1/00769; H04W 24/10
See application file for complete search history.

(56) References Cited

U.S. PATENT DOCUMENTS

2007/0201404 A1    8/2007    Cheon et al.
2007/0298728 A1    12/2007    Imamura et al.
(Continued)

FOREIGN PATENT DOCUMENTS

KR    10-2009-0090230    8/2009

OTHER PUBLICATIONS

R1-113982, "Consideration on CSI feedback for CoMP and feedback container", Nov. 14-18, 2011, pp. 1-5.*
(Continued)

*Primary Examiner* — Andrew Chriss
*Assistant Examiner* — Salvador E Rivas
(74) *Attorney, Agent, or Firm* — Lee Hong Degerman Kang Waimey

(57) ABSTRACT

A method for feeding back Channel State Information (CSI) using a common subband at a user equipment in a wireless communication system is disclosed. The method includes transmitting first CSI to at least one base station at a first transmission time point according to a first CSI feedback configuration, and transmitting second CSI to the at least one base station at a second transmission time point according to a second CSI feedback configuration, wherein the second CSI is generated based on the common subband when the
(Continued)

second transmission time point is within a prescribed Sub-Frame Threshold (SFT) from the first transmission time point.

12 Claims, 21 Drawing Sheets

Related U.S. Application Data filed on Jun. 29, 2012, provisional application No. 61/725,458, filed on Nov. 12, 2012.

(51) Int. Cl.
  *H04B 7/024* (2017.01)
  *H04L 1/00* (2006.01)
  *H04W 24/10* (2009.01)
(52) U.S. Cl.
  CPC ........ *H04B 7/0626* (2013.01); *H04B 7/0632* (2013.01); *H04B 7/0639* (2013.01); *H04B 7/0647* (2013.01); *H04L 1/0026* (2013.01); *H04L 1/0027* (2013.01); *H04L 5/0057* (2013.01); *H04W 24/10* (2013.01)

(56) References Cited

U.S. PATENT DOCUMENTS

| | | | |
|---|---|---|---|
| 2012/0082049 A1* | 4/2012 | Chen | H04W 24/10 370/252 |
| 2012/0113816 A1 | 5/2012 | Bhattad et al. | |
| 2015/0215090 A1* | 7/2015 | Sayana | H04B 7/024 370/329 |

OTHER PUBLICATIONS

R1-122984, "Discussion on CSI feedback modes for CoMP", May 21-25, 2012, pp. 1-5.*
LG Electronics, "Consideration on CoMP CSI Feedback," 3GPP TSG RAN WG1 Meeting #66bis, R1-113275, Oct. 2011, 5 pages.
PCT International Application No. PCT/KR2013/005705, Written Opinion of the International Searching Authority dated Oct. 22, 2013, 9 pages.

* cited by examiner

FIG. 2
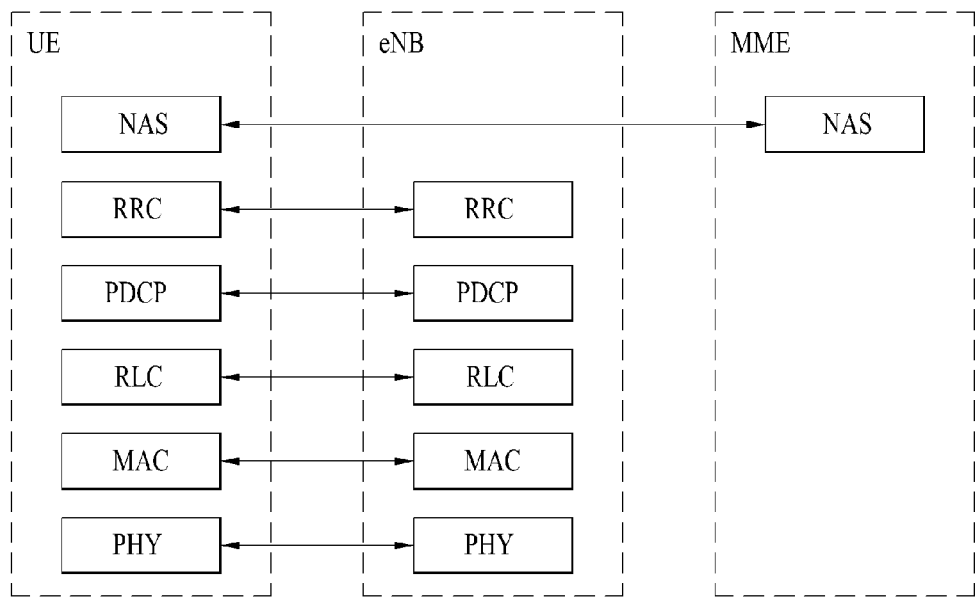
(A) CONTROL-PLANE PROTOCOL STACK
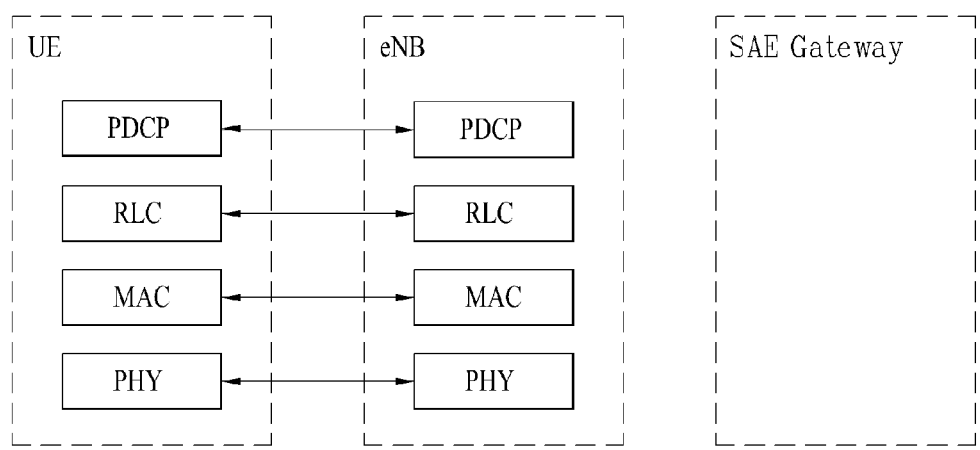
(B) USER-PLANE PROTOCOL STACK

| CQI REPORTING MODE | | PMI FEEDBACK TYPE | |
|---|---|---|---|
| | | NO PMI | SINGLE PMI |
| PUCCH CQI FEEDBACK TYPE | WIDEBAND (WIDEBAND CQI) | MODE 1-0 | MODE 1-1 |
| | UE-SELECTED (SUBBAND CQI) | MODE 2-0 | MODE 2-1 |

FIG. 14
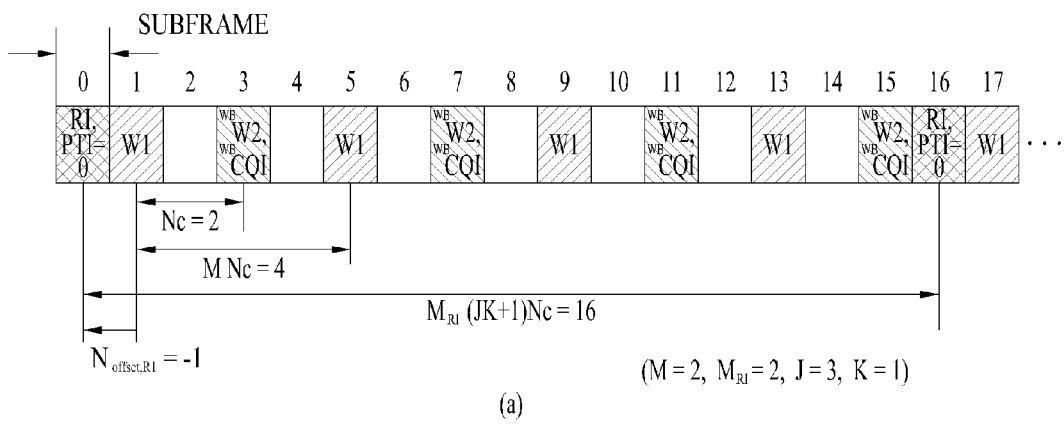
(a)
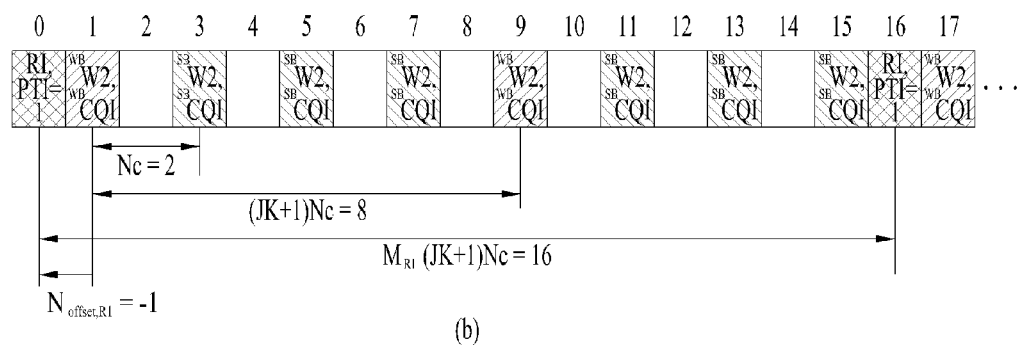
(b)
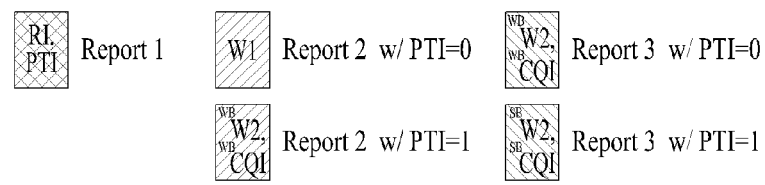

FIG. 17

| Subband 0 PMI / CQI for eNB1 | Subband 1 No CSI for eNB1 | Subband 2 PMI / CQI for eNB1 | Subband 3 No CSI for eNB1 | Subband 4 No CSI for eNB1 | Subband 5 PMI / CQI for eNB1 |
|---|---|---|---|---|---|
| Subband 0 PMI / CQI for eNB2 | Subband 1 No CSI for eNB2 | Subband 2 PMI / CQI for eNB2 | Subband 3 No CSI for eNB2 | Subband 4 No CSI for eNB2 | Subband 5 PMI / CQI for eNB2 |

Channel from eNB1

Channel from eNB2

→ Frequency

METHOD FOR FEEDING BACK CHANNEL STATE INFORMATION IN WIRELESS COMMUNICATION SYSTEM AND APPARATUS THEREFOR

CROSS-REFERENCE TO RELATED APPLICATIONS

This application is the National Stage filing under 35 U.S.C. 371 of International Application No. PCT/KR2013/005705, filed on Jun. 27, 2013, which claims the benefit of U.S. Provisional Application Ser. No. 61/665,884, filed on Jun. 28, 2012, 61/665,912, filed on Jun. 29, 2012 and 61/725,458, filed on Nov. 12, 2012, the contents of which are all hereby incorporated by reference herein in their entirety.

TECHNICAL FIELD

The present invention relates to wireless communication systems, and more particularly, to a method for feeding back channel state information in a wireless communication system and an apparatus therefor.

BACKGROUND ART

As an example of a wireless communication system to which the present invention is applicable, a 3rd Generation Partnership Project Long Term Evolution (3GPP LTE) (hereinafter, referred to as 'LTE') communication system is briefly described.

FIG. 1 is a view schematically illustrating the network architecture of an E-UMTS as an exemplary wireless communication system. An Evolved Universal Mobile Telecommunications System (E-UMTS) is an advanced version of a legacy Universal Mobile Telecommunications System (UMTS) and standardization thereof is currently underway in the 3GPP. E-UMTS may be generally referred to as an LTE system. For details of the technical specifications of UMTS and E-UMTS, reference can respectively be made to Release 7 and Release 8 of "3rd Generation Partnership Project; Technical Specification Group Radio Access Network".

Referring to FIG. 1, the E-UMTS includes a User Equipment (UE), eNode Bs (eNBs), and an Access Gateway (AG) which is located at an end of a network (Evolved-Universal Terrestrial Radio Access Network ((E-UTRAN)) and connected to an external network. The eNBs may simultaneously transmit multiple data streams for a broadcast service, a multicast service, and/or a unicast service.

One or more cells may exist in one eNB. A cell is configured to use one of bandwidths of 1.25, 2.5, 5, 10, 20 MHz to provide a downlink or uplink transport service to several UEs. Different cells may be configured to provide different bandwidths. The eNB controls data transmission and reception for a plurality of UEs. The eNB transmits downlink scheduling information for downlink data to notify a corresponding UE of a data transmission time/frequency domain, coding, data size, and Hybrid Automatic Repeat and reQuest (HARQ)-related information. In addition, the eNB transmits uplink scheduling information for uplink data to inform a corresponding UE of available time/frequency domains, coding, data size, and HARQ-related information. An interface for transmitting user traffic or control traffic may be used between eNBs. A Core Network (CN) may include an AG and a network node for user registration of the UE. The AG manages mobility of the UE on a Tracking Area (TA) basis, wherein one TA consists of a plurality of cells.

Although radio communication technology has been developed up to LTE based on Wideband Code Division Multiple Access (WCDMA), demands and expectations of users and service providers have continued to increase. In addition, since other radio access technologies continue to be developed, new technical evolution is required for future competitiveness. Decrease of cost per bit, increase of service availability, flexible use of a frequency band, simple structure and open interface, and suitable power consumption by a UE are required.

To aid in efficient management of a wireless communication system of an eNB, a UE periodically and/or aperiodically reports state information of a current channel to the eNB. Since the reported state information of the channel may include results calculated in consideration of various situations, a more efficient reporting method is needed.

DISCLOSURE

Technical Problem

An object of the present invention devised to solve the problem lies in providing a method for reporting channel state information in a wireless communication system and an apparatus therefor.

It will be appreciated by persons skilled in the art that that the technical objects that can be achieved through the present invention are not limited to what has been particularly described hereinabove and other technical objects of the present invention will be more clearly understood from the following detailed description.

Technical Solution

The object of the present invention can be achieved by providing a method for feeding back Channel State Information (CSI) using a common subband at a user equipment in a wireless communication system, including transmitting first CSI to at least one base station at a first transmission time point according to a first CSI feedback configuration, and transmitting second CSI to the at least one base station at a second transmission time point according to a second CSI feedback configuration, wherein the second CSI is generated based on the common subband when the second transmission time point is within a prescribed SubFrame Threshold (SFT) from the first transmission time point.

The second CSI may be generated based on a subband selected according to a channel state of the second transmission time point, when the second transmission time point is not within the prescribed SFT from the first transmission time point.

The method may further include transmitting third CSI to the at least one base station at a third transmission time point according to a third CSI feedback configuration, wherein the third CSI is generated based on the common subband when the third transmission time point is within the prescribed SFT from the first transmission time point.

The second CSI and the third CSI may be independently generated based on subbands selected according to CSI transmission time points of the second CSI and the third CSI, when at least one of the second transmission time point and the third transmission time point is not within the prescribed SFT from the first transmission time point.

The method may further include reconfiguring the common subband, when one of the second transmission time point and the third transmission time point is not within the prescribed SFT from the first transmission time point.

Each of the first CSI and the second CSI may include at least one of a Channel Quality Indicator (CQI), a Precoding Matrix Indicator (PMI), and a Rank Indicator (RI).

The first and second CSI may be CSI about the same Bandwidth Part (BP).

In another aspect of the present invention, provided herein is a method for feeding back Channel State Information (CSI) using a common Rank Indicator (RI) at a user equipment in a wireless communication system, including transmitting first CSI to at least one base station at a first transmission time point according to a first CSI feedback configuration, and transmitting second CSI to the at least one base station at a second transmission time point according to a second CSI feedback configuration, wherein the second CSI is generated based on the common RI when the second transmission time point is within a prescribed Subframe Threshold (SFT) from the first transmission time point.

The second CSI may be generated based on a common RI configured selected according to a channel state of the second transmission time point, when the second transmission time point is not within the prescribed SFT from the first transmission time point.

In a further aspect of the present invention, provided herein is a User equipment for feeding back Channel State Information (CSI) using a common subband in a wireless communication system, including a Radio Frequency (RF) unit and a processor, wherein the processor is configured to transmit first CSI to at least one base station at a first transmission time point according to a first CSI feedback configuration and transmit second CSI to the at least one base station at a second transmission time point according to a second CSI feedback configuration, and wherein the second CSI is generated based on the common subband when the second transmission time point is within a prescribed Subframe Threshold (SFT) from the first transmission time point.

The second CSI may be generated based on a subband selected according to a channel state of the second transmission time point, when the second transmission time point is not within the prescribed SFT from the first transmission time point.

The processor may be configured to further transmit third CSI to the at least one base station at a third transmission time point according to a third CSI feedback configuration and wherein the third CSI may be generated based on the common subband when the third transmission time point is within the prescribed SFT from the first transmission time point.

The second CSI and the third CSI may be independently generated based on subbands selected according to CSI transmission time points of the second CSI and the third CSI, when at least one of the second transmission time point and the third transmission time point is not within the prescribed SFT from the first transmission time point.

The processor may be configured to reconfigure the common subband, when one of the second transmission time point and the third transmission time point is not within the prescribed SFT from the first transmission time point.

In a still further aspect of the present invention, provided herein is a user equipment for feeding back Channel State Information (CSI) using a common subband in a wireless communication system, including a Radio Frequency (RF) unit and a processor, wherein the processor is configured to transmit first CSI to at least one base station at a first transmission time point according to a first CSI feedback configuration and transmit second CSI to the at least one base station at a second transmission time point according to a second CSI feedback configuration, and wherein the second CSI is generated based on a common Rank Indicator (RI) when the second transmission time point is within a prescribed Subframe Threshold (SFT) from the first transmission time point.

Advantageous Effects

According to embodiments of the present invention, channel state information can be effectively reported in a wireless communication system.

It will be appreciated by persons skilled in the art that that the effects that can be achieved through the present invention are not limited to what has been particularly described hereinabove and other advantages of the present invention will be more clearly understood from the following detailed description.

DESCRIPTION OF DRAWINGS

The accompanying drawings, which are included to provide a further understanding of the invention, illustrate embodiments of the invention and together with the description serve to explain the principle of the invention.

In the drawings:

FIG. 2(a) and FIG. 2(b) illustrate structures of a control plane and a user plane of a radio interface protocol between a UE and an E-UTRAN based on the 3GPP radio access network specification;

FIG. 14(a) and FIG. 14(b) illustrate a periodic reporting process of CSI when a hierarchical codebook is used;

FIG. 17 illustrates multi-CSI feedback of a UE for cooperation between two eNBs;

BEST MODE

Figure 1:
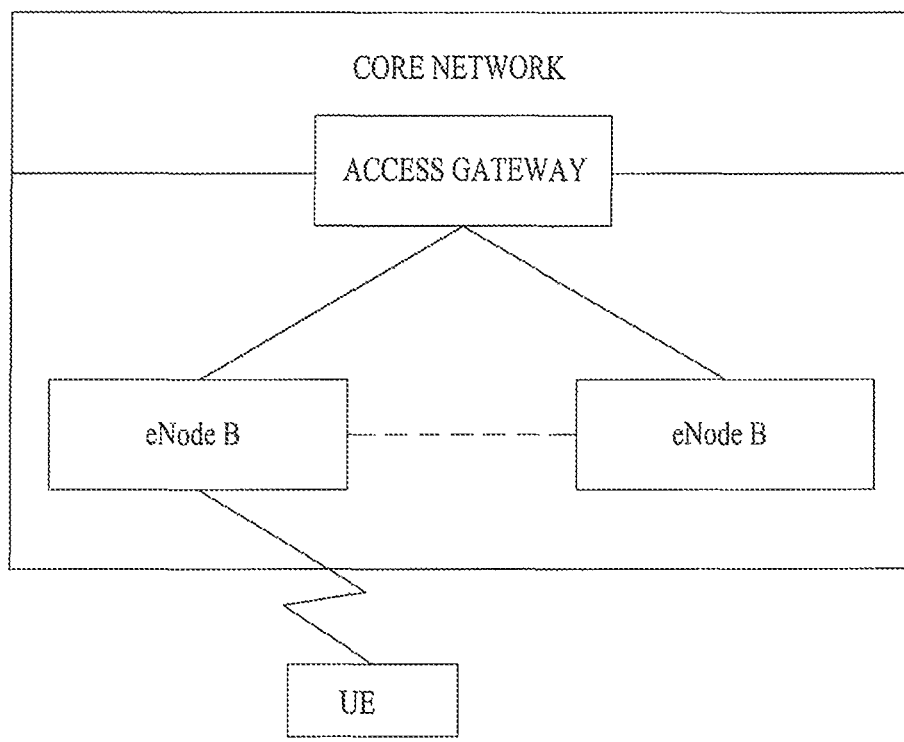
FIG. 1 schematically illustrates the network architecture of an E-UMTS as an exemplary wireless communication system.

Hereinafter, the structures, operations, and other features of the present invention will be understood readily from the embodiments of the present invention, examples of which are described with reference to the accompanying drawings. The embodiments which will be described below are examples in which the technical features of the present invention are applied to a 3GPP system.

Although the embodiments of the present invention will be described based on an LTE system and an LTE-Advanced (LTE-A) system, the LTE system and the LTE-A system are only exemplary and the embodiments of the present invention can be applied to all communication systems corresponding to the aforementioned definition. In addition, although the embodiments of the present invention will herein be described based on Frequency Division Duplex (FDD) mode, the FDD mode is only exemplary and the embodiments of the present invention can easily be modified and applied to Half-FDD (H-FDD) mode or Time Division Duplex (TDD) mode.

FIG. 2 is a view illustrating structures of a control plane and a user plane of a radio interface protocol between a UE and an E-UTRAN based on the 3GPP radio access network specification. Referring to FIG. 2(a), the control plane refers to a path through which control messages used by a User Equipment (UE) and a network to manage a call are transmitted. Referring to FIG. 2(b), the user plane refers to a path through which data generated in an application layer, e.g. voice data or Internet packet data, is transmitted.

A physical layer of a first layer provides an information transfer service to an upper layer using a physical channel. The physical layer is connected to a Medium Access Control (MAC) layer of an upper layer via a transport channel. Data is transported between the MAC layer and the physical layer via the transport channel. Data is also transported between a physical layer of a transmitting side and a physical layer of a receiving side via a physical channel. The physical channel uses time and frequency as radio resources. Specifically, the physical channel is modulated using an Orthogonal Frequency Division Multiple Access (OFDMA) scheme in downlink and is modulated using a Single-Carrier Frequency Division Multiple Access (SC-FDMA) scheme in uplink.

A MAC layer of a second layer provides a service to a Radio Link Control (RLC) layer of an upper layer via a logical channel. The RLC layer of the second layer supports reliable data transmission. The function of the RLC layer may be implemented by a functional block within the MAC. A Packet Data Convergence Protocol (PDCP) layer of the second layer performs a header compression function to reduce unnecessary control information for efficient transmission of an Internet Protocol (IP) packet such as an IPv4 or IPv6 packet in a radio interface having a relatively narrow bandwidth.

A Radio Resource Control (RRC) layer located at the bottommost portion of a third layer is defined only in the control plane. The RRC layer controls logical channels, transport channels, and physical channels in relation to configuration, re-configuration, and release of radio bearers. The radio bearers refer to a service provided by the second layer to transmit data between the UE and the network. To this end, the RRC layer of the UE and the RRC layer of the network exchange RRC messages. The UE is in an RRC connected mode if an RRC connection has been established between the RRC layer of the radio network and the RRC layer of the UE. Otherwise, the UE is in an RRC idle mode. A Non-Access Stratum (NAS) layer located at an upper level of the RRC layer performs functions such as session management and mobility management.

One cell of an eNB is set to use one of bandwidths such as 1.25, 2.5, 5, 10, 15, and 20 MHz to provide a downlink or uplink transmission service to a plurality of UEs. Different cells may be set to provide different bandwidths.

Downlink transport channels for data transmission from a network to a UE include a Broadcast Channel (BCH) for transmitting system information, a Paging Channel (PCH) for transmitting paging messages, and a downlink Shared Channel (SCH) for transmitting user traffic or control messages. Traffic or control messages of a downlink multicast or broadcast service may be transmitted through the downlink SCH or may be transmitted through an additional downlink Multicast Channel (MCH). Meanwhile, uplink transport channels for data transmission from the UE to the network include a Random Access Channel (RACH) for transmitting initial control messages and an uplink SCH for transmitting user traffic or control messages. Logical channels, which are located at an upper level of the transport channels and are mapped to the transport channels, include a Broadcast Control Channel (BCCH), a Paging Control Channel (PCCH), a Common Control Channel (CCCH), a Multicast Control Channel (MCCH), and a Multicast Traffic Channel (MTCH).

Figure 3:
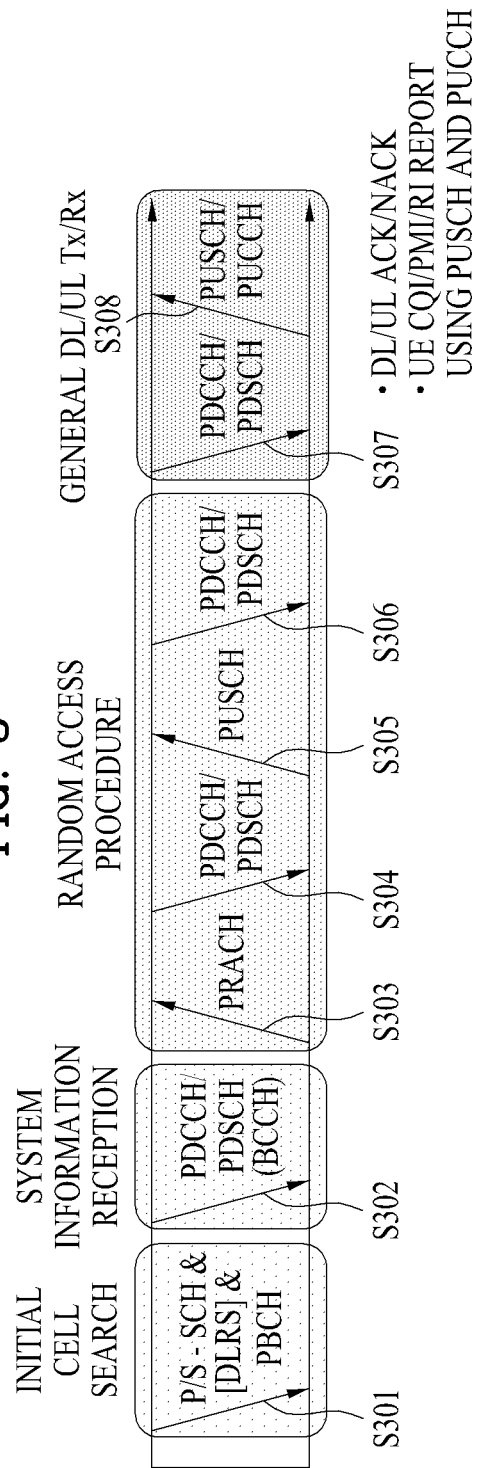
FIG. 3 illustrates physical channels used in a 3GPP system and a general signal transmission method using the same.

FIG. 3 is a view illustrating physical channels used in a 3GPP system and a general signal transmission method using the same.

A UE performs initial cell search such as establishment of synchronization with an eNB when power is turned on or the UE enters a new cell (step S301). The UE may receive a Primary Synchronization Channel (P-SCH) and a Secondary Synchronization Channel (S-SCH) from the eNB, establish synchronization with the eNB, and acquire information such as a cell identity (ID). Thereafter, the UE may receive a physical broadcast channel from the eNB to acquire broadcast information within the cell. Meanwhile, the UE may receive a Downlink Reference Signal (DL RS) in the initial cell search step to confirm a downlink channel state.

Upon completion of initial cell search, the UE may receive a Physical Downlink Control Channel (PDCCH) and a Physical Downlink Shared Channel (PDSCH) according to information carried on the PDCCH to acquire more detailed system information (step S302).

Meanwhile, if the UE initially accesses the eNB or if radio resources for signal transmission are not present, the UE may perform a random access procedure (steps S303 to S306) with respect to the eNB. To this end, the UE may transmit a specific sequence through a Physical Random Access Channel (PRACH) as a preamble (steps S303 and S305), and receive a response message to the preamble through the PDCCH and the PDSCH corresponding thereto (steps S304 and S306). In the case of a contention-based RACH, a contention resolution procedure may be additionally performed.

The UE which performs the above procedures may receive a PDCCH/PDSCH (step S307) and transmit a Physical Uplink Shared Channel (PUSCH)/Physical Uplink Control Channel (PUCCH) (step S308) according to a general uplink/downlink signal transmission procedure. Especially, the UE receives Downlink Control Information (DCI) through the PDCCH. The DCI includes control information such as resource allocation information for the UE and has different formats according to use purpose.

Meanwhile, control information, transmitted by the UE to the eNB through uplink or received by the UE from the eNB through downlink, includes a downlink/uplink ACKnowledgment/Negative ACKnowledgment (ACK/NACK) signal, a Channel Quality Indicator (CQI), a Precoding Matrix Index (PMI), a Rank Indicator (RI), and the like. In the case of the 3GPP LTE system, the UE may transmit control information such as CQI/PMI/RI through the PUSCH and/or the PUCCH.

Figure 4:
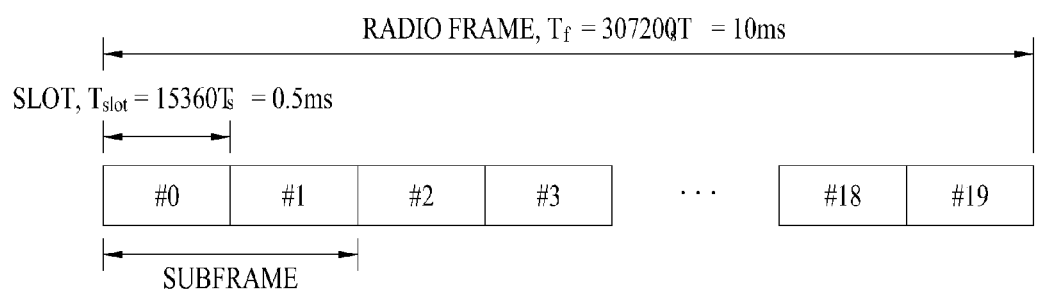
FIG. 4 illustrates the structure of a radio frame used in an LTE system.

FIG. 4 is a view illustrating the structure of a radio frame used in an LTE system.

Referring to FIG. 4, the radio frame has a length of 10 ms (327200 $T_s$) and includes 10 equally-sized subframes. Each of the subframes has a length of 1 ms and includes two slots. Each of the slots has a length of 0.5 ms (15360 $T_s$). In this case, $T_s$ denotes sampling time and is represented by $T_s=1/(15 \text{ kHz} \times 2048)=3.2552\times10^{-8}$ (about 33 ns). Each slot includes a plurality of OFDM symbols in a time domain and includes a plurality of Resource Blocks (RBs) in a frequency domain. In the LTE system, one resource block includes 12 subcarriers×7 (or 6) OFDM symbols. A Transmission Time Interval (TTI), which is a unit time for data transmission, may be determined in units of one or more subframes. The above-described structure of the radio frame is purely exemplary and various modifications may be made in the number of subframes included in a radio frame, the number of slots included in a subframe, or the number of OFDM symbols included in a slot.

Figure 5:
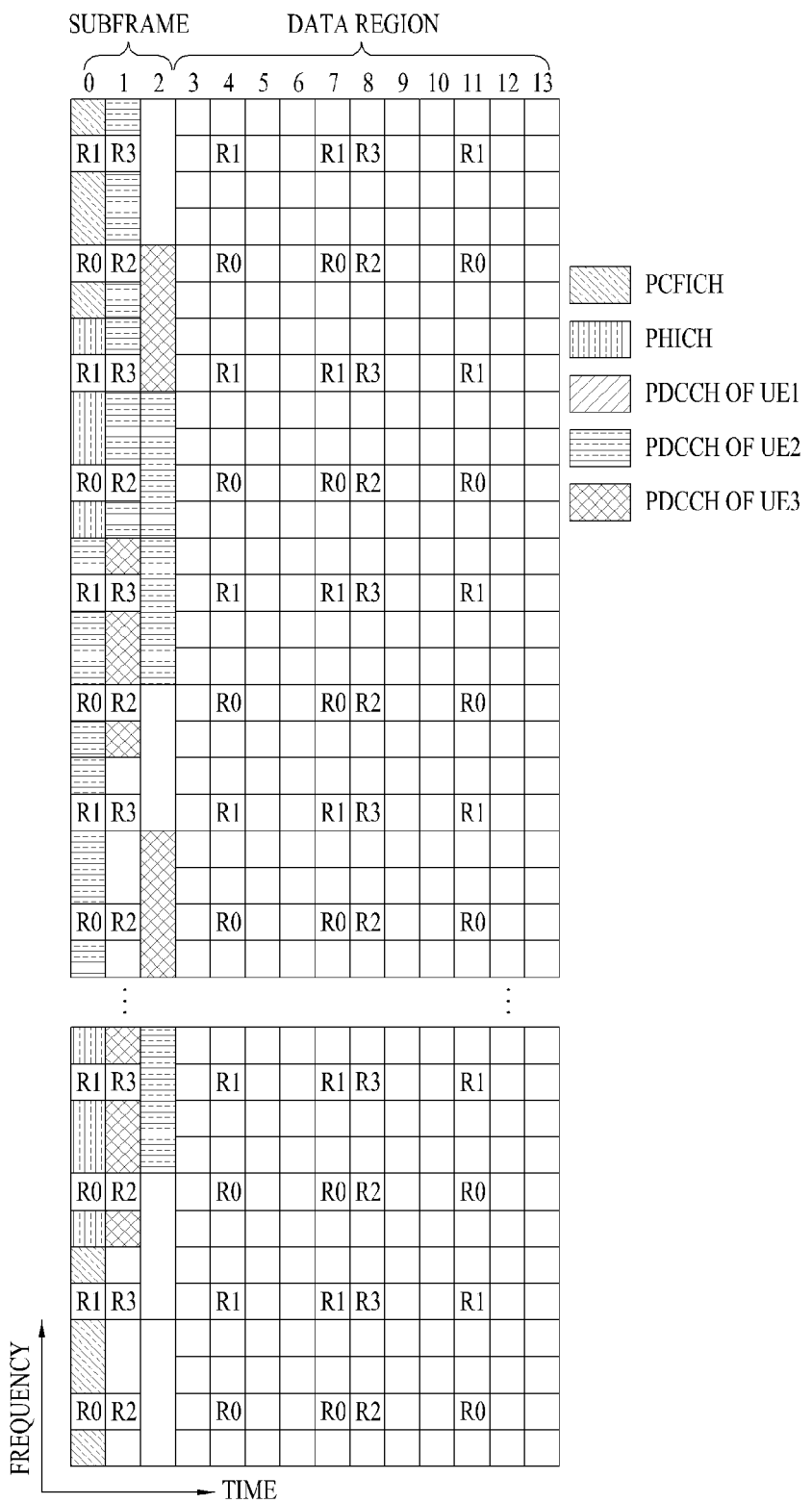
FIG. 5 illustrates the structure of a downlink radio frame used in an LTE system.

FIG. 5 is a view illustrating control channels contained in a control region of one subframe in a downlink radio frame.

Referring to FIG. 5, one subframe includes 14 OFDM symbols. The first to third ones of the 14 OFDM symbols may be used as a control region and the remaining 13 to 11 OFDM symbols may be used as a data region, according to subframe configuration. In FIG. 5, R1 to R4 represent reference signals (RSs) or pilot signals for antennas 0 to 3, respectively. The RSs are fixed to a predetermined pattern within the subframe irrespective of the control region and the data region. Control channels are allocated to resources to which the RS is not allocated in the control region. Traffic channels are allocated to resources, to which the RS is not allocated, in the data region. The control channels allocated to the control region include a Physical Control Format Indicator Channel (PCFICH), a Physical Hybrid-ARQ Indicator Channel (PHICH), a Physical Downlink Control Channel (PDCCH), etc.

The PCFICH, physical control format indicator channel, informs a UE of the number of OFDM symbols used for the PDCCH per subframe. The PCFICH is located in the first OFDM symbol and is established prior to the PHICH and the PDCCH. The PCFICH is comprised of 4 Resource Element Groups (REGs) and each of the REGs is distributed in the control region based on a cell ID. One REG includes 4 Resource Elements (REs). The RE indicates a minimum physical resource defined as one subcarrier x one OFDM symbol. The PCFICH value indicates values of 1 to 3 or values of 2 to 4 depending on bandwidth and is modulated by Quadrature Phase Shift Keying (QPSK).

The PHICH, physical Hybrid-ARQ indicator channel, is used to transmit a HARQ ACK/NACK signal for uplink transmission. That is, the PHICH indicates a channel through which downlink ACK/NACK information for uplink HARQ is transmitted. The PHICH includes one REG and is cell-specifically scrambled. The ACK/NACK signal is indicated by 1 bit and is modulated by Binary Phase Shift Keying (BPSK). The modulated ACK/NACK signal is spread by a Spreading Factor (SF)=2 or 4. A plurality of PHICHs mapped to the same resource constitutes a PHICH group. The number of PHICHs multiplexed to the PHICH group is determined depending on the number of SFs. The PHICH (group) is repeated three times to obtain diversity gain in a frequency domain and/or a time domain.

The PDCCH, physical downlink control channel, is allocated to the first n OFDM symbols of a subframe. In this case, n is an integer greater than 1 and is indicated by the PCFICH. The PDCCH is comprised of one or more Control Channel Elements (CCEs). The PDCCH informs each UE or UE group of information associated with resource allocation of a Paging Channel (PCH) and a Downlink-Shared Channel (DL-SCH), uplink scheduling grant, Hybrid Automatic Repeat Request (HARQ) information, etc. Therefore, an eNB and a UE transmit and receive data other than specific control information or specific service data through the PDSCH.

Information indicating to which UE or UEs PDSCH data is to be transmitted, information indicating how UEs are to receive PDSCH data, and information indicating how UEs are to perform decoding are contained in the PDCCH. For example, it is assumed that a specific PDCCH is CRC-masked with a Radio Network Temporary Identity (RNTI) "A" and information about data, that is transmitted using radio resources "B" (e.g., frequency location) and transport format information "C" (e.g., transmission block size, modulation scheme, coding information, etc.), is transmitted through a specific subframe. In this case, a UE located in a cell monitors the PDCCH using its own RNTI information. If one or more UEs having the RNTI 'A' are present, the UEs receive the PDCCH and receive the PDSCH indicated by 'B' and 'C' through the received PDCCH information.

Figure 6:
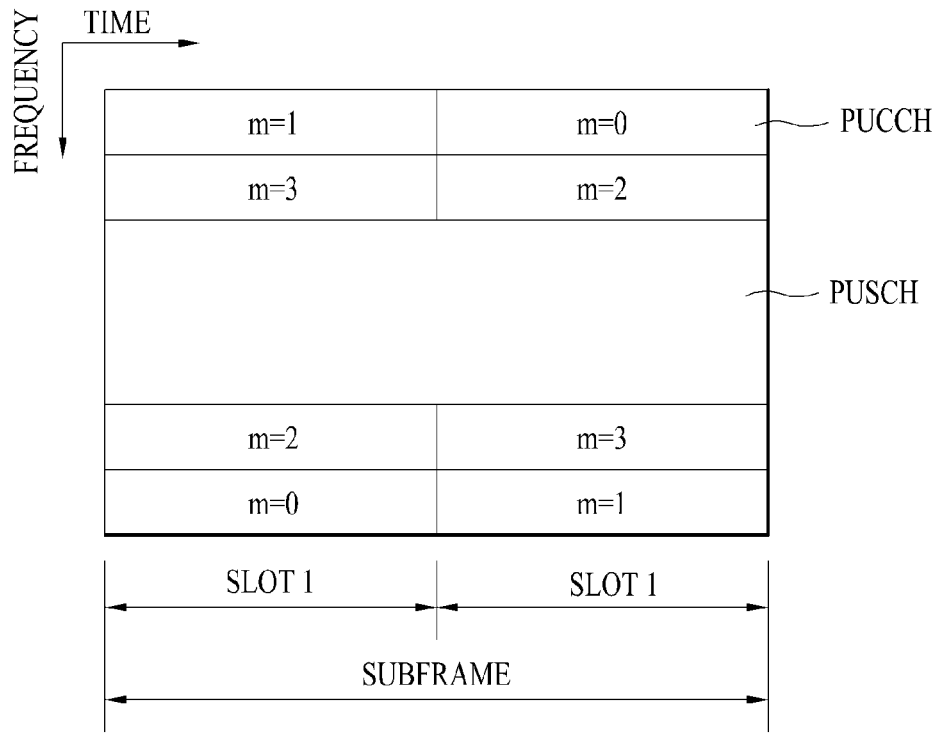
FIG. 6 illustrates the structure of an uplink subframe used in the LTE system.

FIG. 6 illustrates the structure of an uplink subframe used in the LTE system.

Referring to FIG. 6, an uplink subframe is divided into a region to which a PUCCH is allocated to transmit control information and a region to which a PUSCH is allocated to transmit user data. The PUSCH is allocated to the middle of the subframe, whereas the PUCCH is allocated to both ends of a data region in the frequency domain. The control information transmitted on the PUCCH includes an ACK/NACK, a CQI representing a downlink channel state, an RI for Multiple Input and Multiple Output (MIMO), a Scheduling Request (SR) indicating a request for allocation of uplink resources, etc. A PUCCH of a UE occupies one RB in a different frequency in each slot of a subframe. That is, two RBs allocated to the PUCCH frequency-hop over the slot boundary. Particularly, FIG. 6 illustrates an example in which PUCCHs for m=0, m=1, m=2, and m=3 are allocated to a subframe.

Hereinafter, a MIMO system will be described. MIMO refers to a method of using multiple transmission antennas and multiple reception antennas to improve data transmission/reception efficiency. Namely, a plurality of antennas is used at a transmitting end or a receiving end of a wireless communication system so that capacity can be increased and performance can be improved. MIMO may also be referred to as 'multi-antenna' in this disclosure.

MIMO technology does not depend on a single antenna path in order to receive a whole message. Instead, MIMO technology collects data fragments received via several antennas, merges the data fragments, and forms complete data. The use of MIMO technology can increase system coverage while improving data transfer rate within a cell area of a specific size or guaranteeing a specific data transfer rate. MIMO technology can be widely used in mobile communication terminals and relay nodes. MIMO technology can overcome the limitations of the restricted amount of transmission data of single antenna based mobile communication systems.

Figure 7:
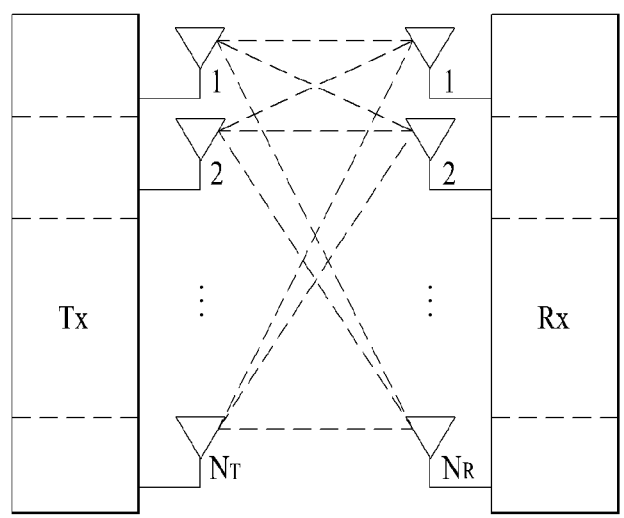
FIG. 7 illustrates the configuration of a general MIMO communication system.

The configuration of a general MIMO communication system is shown in FIG. 7. A transmitting end is equipped with $N_T$ transmission (Tx) antennas and a receiving end is equipped with $N_R$ reception (Rx) antennas. If a plurality of antennas is used both at the transmitting end and at the receiving end, theoretical channel transmission capacity increases unlike the case where only either the transmitting end or the receiving end uses a plurality of antennas. Increase in channel transmission capacity is proportional to the number of antennas, thereby improving transfer rate and frequency efficiency. If a maximum transfer rate using a signal antenna is $R_o$, a transfer rate using multiple antennas can be theoretically increased by the product of the maximum transfer rate $R_o$ by a rate increment $R_i$. The rate increment $R_i$ is represented by the following equation 1 where $R_i$ is the smaller of $N_T$ and $N_R$.

$$R_i = \min(N_T, N_R) \quad \text{[Equation 1]}$$

For example, in a MIMO communication system using four Tx antennas and four Rx antennas, it is possible to theoretically acquire a transfer rate four times that of a single antenna system. After theoretical increase in the capacity of the MIMO system was first demonstrated in the mid-1990s, various techniques for substantially improving data transfer rate have been under development. Several of these techniques have already been incorporated into a variety of wireless communication standards including, for example, $3^{rd}$ generation mobile communication and next-generation wireless local area networks.

Active research up to now related to MIMO technology has focused upon a number of different aspects, including research into information theory related to MIMO communication capacity calculation in various channel environments and in multiple access environments, research into wireless channel measurement and model derivation of MIMO systems, and research into space-time signal processing technologies for improving transmission reliability and transfer rate.

To describe a communication method in a MIMO system in detail, a mathematical model thereof is given below. As shown in FIG. 7, it is assumed that $N_T$ Tx antennas and $N_R$ Rx antennas are present. In the case of a transmission signal, a maximum number of transmittable pieces of information is $N_T$ under the condition that $N_T$ Tx antennas are used, so that transmission information can be represented by a vector represented by the following equation 2:

$$S = [S_1, S_2, \ldots, S_{N_T}]^T \quad \text{[Equation 2]}$$

Meanwhile, individual transmission information pieces $S_1, S_2, \ldots, S_{N_T}$ may have different transmission powers. In this case, if the individual transmission powers are denoted by $P_1, P_2, \ldots, P_{N_T}$, transmission information having adjusted transmission powers can be represented by a vector shown in the following equation 3:

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \quad \text{[Equation 3]}$$

The transmission power-controlled transmission information vector $\hat{S}$ may be expressed as follows, using a diagonal matrix P of a transmission power:

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

$N_T$ transmission signals $x_1, x_2, \ldots, x_{N_T}$ to be actually transmitted may be configured by multiplying the transmission power-controlled information vector $\hat{S}$ by a weight matrix W. In this case, the weight matrix is adapted to properly distribute transmission information to individual antennas according to transmission channel situations. The transmission signals $x_1, x_2, \ldots, x_{N_T}$ can be represented by the following Equation 5 using a vector X. In Equation 5, $W_{ij}$ is a weight between the i-th Tx antenna and the j-th information and W is a weight matrix, which may also be referred to as a precoding matrix.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \\ w_{i1} & w_{i2} & \cdots & w_{iN_T} \\ \vdots & & \ddots & \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs \quad \text{[Equation 5]}$$

Generally, the physical meaning of a rank of a channel matrix may be a maximum number of different pieces of information that can be transmitted in a given channel. Accordingly, since the rank of the channel matrix is defined as the smaller of the number of rows or columns, which are independent of each other, the rank of the matrix is not greater than the number of rows or columns. A rank of a channel matrix H, rank(H), is restricted as follows.

$$\text{rank}(H) \leq \min(N_T, N_R) \quad \text{[Equation 6]}$$

Each unit of different information transmitted using MIMO technology is defined as a 'transmission stream' or simply 'stream'. The 'stream' may be referred to as a 'layer'. The number of transmission streams is not greater than a rank of a channel which is a maximum number of different pieces of transmittable information. Accordingly, the channel matrix H may be indicted by the following Equation 7:

$$\text{\# of streams} \leq \text{rank}(H) \leq \min(N_T, N_R) \quad \text{[Equation 7]}$$

where '# of streams' denotes the number of streams. It should be noted that one stream may be transmitted through one or more antennas.

There may be various methods of allowing one or more streams to correspond to multiple antennas. These methods may be described as follows according to types of MIMO technology. The case where one stream is transmitted via multiple antennas may be called spatial diversity, and the case where multiple streams are transmitted via multiple antennas may be called spatial multiplexing. It is also possible to configure a hybrid of spatial diversity and spatial multiplexing.

Now, a description of a Channel State Information (CSI) report is given. In the current LTE standard, a MIMO transmission scheme is categorized into open-loop MIMO operated without CSI and closed-loop MIMO operated based on CSI. Especially, according to the closed-loop MIMO system, each of the eNB and the UE may be able to perform beamforming based on CSI to obtain a multiplexing gain of MIMO antennas. To obtain CSI from the UE, the eNB allocates a PUCCH or a PUSCH to command the UE to feed back CSI for a downlink signal.

CSI is divided into three types of information: a Rank Indicator (RI), a Precoding Matrix Index (PMI), and a Channel Quality Indicator (CQI). First, RI is information on a channel rank as described above and indicates the number of streams that can be received via the same time-frequency resource. Since RI is determined by long-term fading of a channel, it may be generally fed back at a cycle longer than that of PMI or CQI.

Second, PMI is a value reflecting a spatial characteristic of a channel and indicates a precoding matrix index of the eNB preferred by the UE based on a metric of Signal-to-Interference plus Noise Ratio (SINR). Lastly, CQI is information indicating the strength of a channel and indicates a reception SINR obtainable when the eNB uses PMI.

In an evolved communication system such as an LTE-A system, multi-user diversity using Multi-User MIMO (MU-MIMO) is additionally obtained. Since interference between UEs multiplexed in an antenna domain exists in the MU-MIMO scheme, CSI accuracy may greatly affect not only interference of a UE that has reported CSI but also interference of other multiplexed UEs. Hence, in order to correctly perform MU-MIMO operation, it is necessary to report CSI having accuracy higher than that of a Single User-MIMO (SU-MIMO) scheme.

Accordingly, LTE-A standard has determined that a final PMI should be separately designed into W1, which a long-term and/or wideband PMI, and W2, which is a short-term and/or subband PMI.

An example of a hierarchical codebook transform scheme configuring one final PMI from among W1 and W2 may use a long-term covariance matrix of a channel as indicated in Equation 8:

$$W = \mathrm{norm}(W1\,W2) \quad [\text{Equation 8}]$$

In Equation 8, W2 of a short-term PMI indicates a codeword of a codebook configured to reflect short-term channel information, W denotes a codeword of a final codebook, and norm(A) indicates a matrix in which a norm of each column of a matrix A is normalized to 1.

The detailed configurations of W1 and W2 are shown in Equation 9:

$$W1(i) = \begin{bmatrix} X_i & 0 \\ 0 & X_i \end{bmatrix}, \text{ where } X_i \text{ is } Nt/2 \text{ by } M \text{ matrix.} \quad [\text{Equation 9}]$$

-continued $$W2(j) = \overbrace{\begin{bmatrix} e_M^k & e_M^l & \cdots & e_M^m \\ \alpha_j e_M^k & \beta_j e_M^l & & \gamma_j e_M^m \end{bmatrix}}^{r \text{ columns}}$$

(if rank = $r$), where $1 \le k$, $l, m \le M$ and $k, l, m$ are integer.

where Nt is the number of Tx antennas, M is the number of columns of a matrix Xi, indicating that the matrix Xi includes a total of M candidate column vectors. eMk, eMl, and eMm denote k-th, l-th, and m-th column vectors of the matrix Xi in which only k-th, l-th, and m-th elements among M elements are 0 and the other elements are 0, respectively. $\alpha_j$, $\beta_j$, and $\gamma_j$ are complex values each having a unit norm and indicate that, when the k-th, l-th, and m-th column vectors of the matrix Xi are selected, phase rotation is applied to the column vectors. At this time, i is an integer greater than 0, denoting a PMI index indicating W1 and j is an integer greater than 0, denoting a PMI index indicating W2.

In Equation 9, the codebook configurations are designed to reflect channel correlation properties generated when cross polarized antennas are used and when a space between antennas is dense, for example, when a distance between adjacent antennas is less than a half of signal wavelength. The cross polarized antennas may be categorized into a horizontal antenna group and a vertical antenna group. Each antenna group has the characteristic of a Uniform Linear Array (ULA) antenna and the two groups are co-located.

Accordingly, a correlation between antennas of each group has characteristics of the same linear phase increment and a correlation between antenna groups has characteristics of phase rotation. Consequently, since a codebook is a value obtained by quantizing a channel, it is necessary to design a codebook such that characteristics of a channel are reflected. For convenience of description, a rank-1 codeword generated by the aforementioned configurations is shown as follows:

$$W1(i) * W2(j) = \begin{bmatrix} X_i(k) \\ \alpha_j X_i(k) \end{bmatrix} \quad [\text{Equation 10}]$$

In Equation 10, a codeword is expressed as a vector of $N_T \times 1$ (where $N_T$ is the number of Tx antennas) and is structured with an upper vector $X_i(k)$ and a lower vector $\alpha_j X_i(k)$ which show correlation characteristics of a horizontal antenna group and a vertical antenna group, respectively. $X_i(k)$ is preferably expressed as a vector having the characteristics of linear phase increment by reflecting the characteristics of a correlation between antennas of each antenna group and may be a DFT matrix as a representative example.

As described above, CSI in the LTE system includes, but is not limited to, CQI, PMI, and RI. According to transmission mode of each UE, all or some of the CQI, PMI, and RI is transmitted. Periodic transmission of CSI is referred to as periodic reporting and transmission of CSI at the request of an eNB is referred to as aperiodic reporting. In aperiodic reporting, a request bit included in uplink scheduling information transmitted by the eNB is transmitted to the UE. Then, the UE transmits CSI considering transmission mode thereof to the eNB through an uplink data channel (PUSCH). In periodic reporting, a period of CSI and an offset at the period are signaled in the unit of subframes by a semi-static scheme through a higher-layer signal per UE. The UE transmits CSI considering transmission mode to the eNB through an uplink control channel (PUCCH). If there is uplink data in a subframe in which CSI is transmitted, the CSI is transmitted through an uplink data channel (PUSCH) together with the uplink data. The eNB transmits transmission timing information suitable for each UE to the UE in consideration of a channel state of each UE and a UE distributed situation in a cell. The transmission timing information includes a period and an offset necessary for transmitting CSI and may be transmitted to each UE through an RRC message.

FIGS. 8 to 11 illustrate periodic reporting of CSI in an LTE system.

Figures 8, 9:
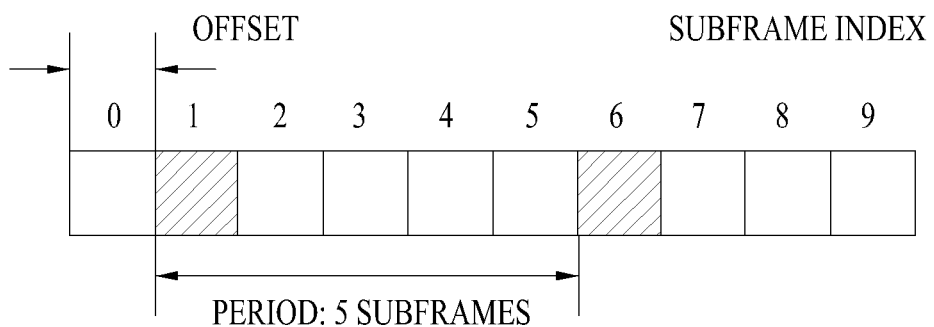
FIGS. 8, 9, 10, 11(a) and 11(b) illustrate periodic reporting of CSI.

Referring to FIG. 8, there are four CQI reporting modes in the LTE system. Specifically, the CQI reporting modes may be divided into modes in a WideBand (WB) CQI and modes in a SubBand (SB) CQI according to CQI feedback type. The CQI reporting mode may also be divided into modes in a No PMI and modes in a single PMI depending on whether a PMI is transmitted or not. Each UE is informed of information comprised of a period and an offset through RRC signaling in order to periodically report CQI.

FIG. 9 illustrates an example of transmitting CSI when a UE receives information indicating {a period '5' and an offset '1'} through signaling. Referring to FIG. 9, upon receiving the information indicating the period '5' and offset '1', the UE transmits CSI in the unit of 5 subframes with an offset of one subframe in ascending order of a subframe index counted from 0 starting from the first subframe. Although the CSI is transmitted basically through a PUCCH, if a PUSCH for data transmission is present at the same transmission time point, the CSI is transmitted through the PUSCH together with data. The subframe index is given as a combination of a system frame number (or a radio frame index) $n_f$ and a slot index $n_s$ (0 to 19). Since one subframe includes two slots, the subframe index may be defined as $10 \times n_f + \text{floor}(n_s/2)$ wherein floor( ) indicates the floor function.

CQI transmission types include a type of transmitting a WB CQI only and a type of transmitting both a WB CQI and an SB CQI. In the type of transmitting a WB CQI only, CQI information for all bands is transmitted in subframes corresponding to every CQI transmission period. Meanwhile, in the case in which PMI information should also be transmitted according to the PMI feedback type as illustrated in FIG. 8, the PMI information is transmitted together with the CQI information. In the type of transmitting both a WB CQI and an SB CQI, the WB CQI and SB CQI are alternately transmitted.

Figure 10:
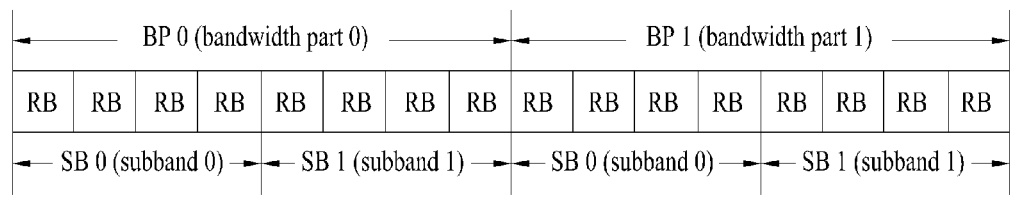
Figure 11:
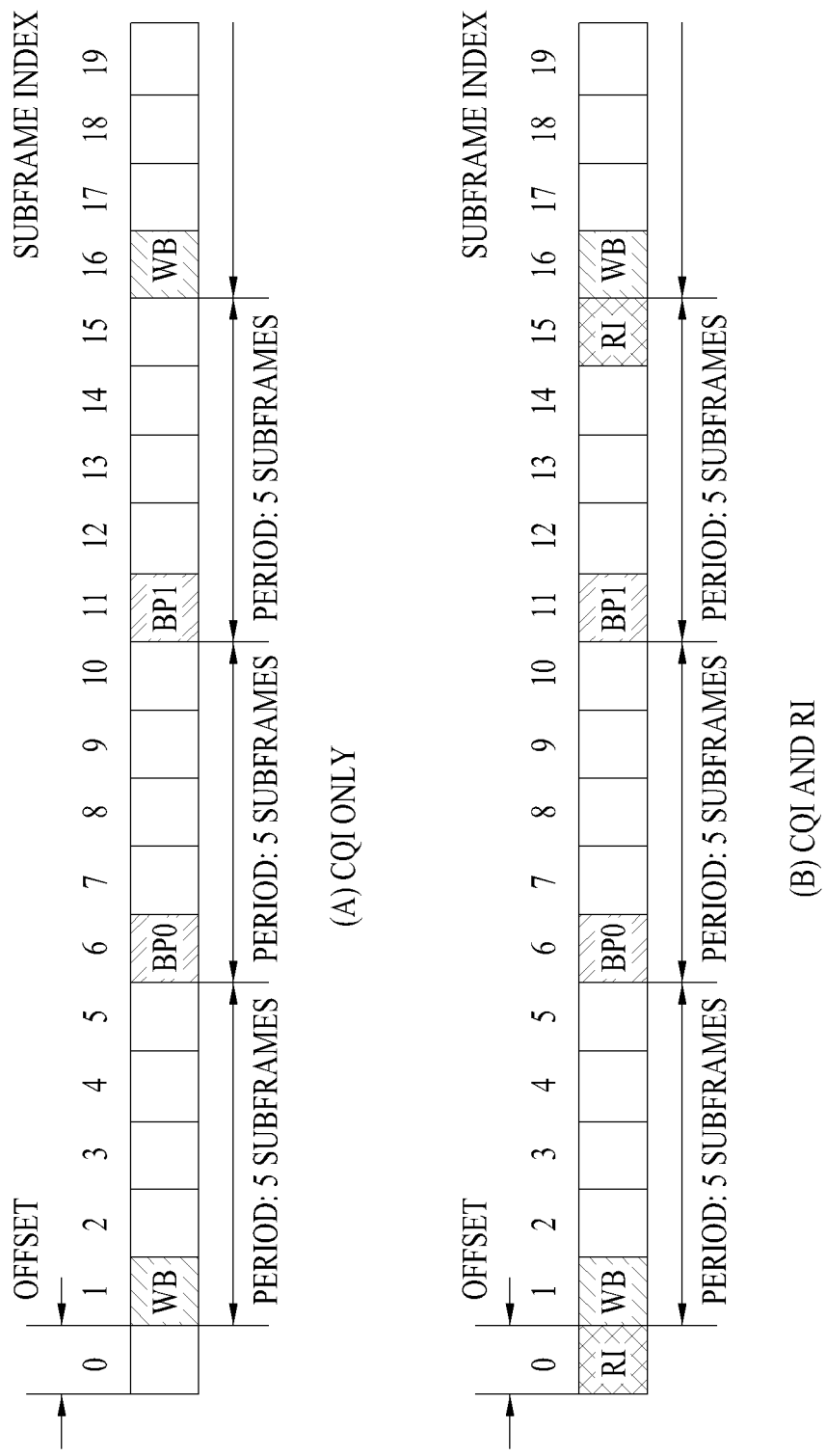

FIG. 10 illustrates a system in which a system bandwidth consists of 16 RBs. It is assumed that the system bandwidth includes two Bandwidth Parts (BPs) BP0 and BP1 each consisting of two SubBands (SBs) SB0 and SB1 and each SB includes 4 RBs. The above assumption is exemplary and the number of BPs and the size of each SB may vary with the size of the system bandwidth. The number of SBs constituting each BP may differ according to the number of RBs, the number of BPs, and the size of each SB.

In the CQI transmission type of transmitting both a WB CQI and an SB CQI, the WB CQI is transmitted in the first CQI transmission subframe and an SB CQI of the better SB state of SB0 and SB1 in BP0 is transmitted in the next CQI transmission subframe together with and an index of the corresponding SB (e.g. Subband Selection Indicator (SSI)). Thereafter, an SB CQI of the better SB state of SB0 and SB1 in BP1 and an index of the corresponding SB are transmitted in the next CQI transmission subframe. Thus, CQI of each BP is sequentially transmitted after transmission of the WB CQI. The CQI of each BP may be sequentially transmitted once to four times during the interval between transmission intervals of two WB CQIs. For example, if the CQI of each BP is transmitted once during the time interval between two WB CQIs, CQIs may be transmitted in the order of WB CQI⇒ BP0 CQI⇒ BP1 CQI⇒ WB CQI. If the CQI of each BP is transmitted four times during the time interval between two WB CQIs, CQIs may be transmitted in the order of WB CQI⇒ BP0 CQI⇒ BP1 CQI⇒ BP0 CQI⇒ BP1 CQI⇒ BP0 CQI⇒ BP1 CQI⇒ BP0 CQI⇒ BP1 CQI⇒ WB CQI. Information as to how many times each BP CQI is transmitted is signaled by a higher layer (RRC layer).

FIG. 11(a) and FIG. 11(b) illustrate examples of transmitting both a WB CQI and an SB CQI when a UE receives information indicating {period '5' and offset '1'} through signaling. Referring to FIG. 11(a), a CQI may be transmitted only in subframes corresponding to the signaled period and offset regardless of type. FIG. 11(b) illustrates an example of transmitting an RI in addition to the example shown in FIG. 11(a). The RI may be signaled as a combination of a multiple of a WB CQI transmission period and an offset at the transmission period from a higher layer (e.g. RRC layer). The offset of the RI is signaled using a value relative to the offset of a CQI. For example, if the offset of the CQI is '1' and the offset of the RI is '0', the RI has the same offset as the CQI. The offset value of the RI is defined as 0 or a negative number. More specifically, it is assumed in FIG. 11(b) that, in an environment identical to that of FIG. 11(a), an RI transmission period is a multiple of 1 of the WB CQI transmission period and the RI offset is '−1'. Since the RS transmission period is a multiple of 1 of the WB CQI transmission period, the RS transmission period and the WB CQI transmission period are substantially the same. Since the offset of the RI is '−1', the RI is transmitted based upon the value '−1' (i.e. subframe index 0) relative to the offset '1' of the CQI in FIG. 11(a). If the offset of the RI is '0', the transmission subframes of the WB CQI and RI overlap. In this case, the WB CQI is dropped and the RI is transmitted.

Figure 12:
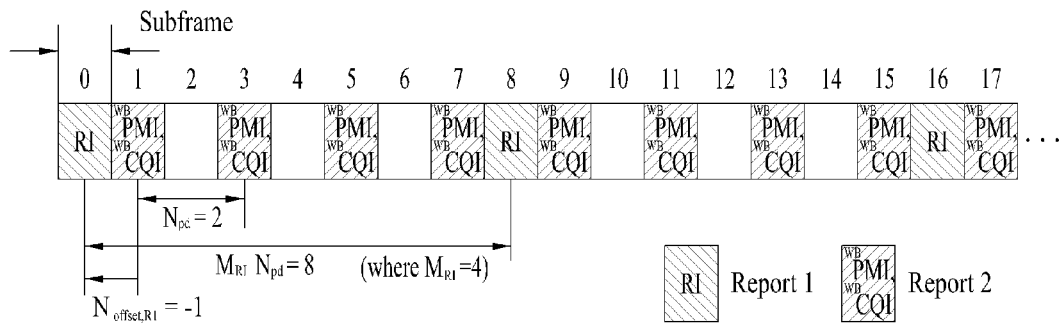
FIGS. 12 and 13 illustrate periodic reporting processes of CSI when a non-hierarchical codebook is used.

FIG. 12 illustrates CSI feedback in the case of Mode 1-1 of FIG. 8.

Referring to FIG. 12, CSI feedback is comprised of two types of report content, i.e. transmission of Report 1 and transmission of Report 2. More specifically, an RI is transmitted through Report 1 and a WB PMI and a WB CQI are transmitted through Report 2. Report 2 is transmitted in subframe indexes satisfying $(10^*n_f+\text{floor}(n_s/2)-N_{offset,CQI}) \mod (N_{pd})=0$. $N_{offset,CQI}$ indicates an offset for PMI/CQI transmission shown in FIG. 9. In FIG. 12, $N_{offset,CQI}=1$. $N_{pd}$ illustrates an interval of subframes between contiguous Reports 2 and the case of $N_{pd}=2$ is illustrated in FIG. 12. Report 1 is transmitted in subframe indexes satisfying $(10^*n_f+\text{floor}(n_s/2)-N_{offset,CQI}-N_{offset,RI}) \mod(M_{RI}^*N_{pd})=0$. $M_{RI}$ is determined by higher layer signaling. $N_{offset,RI}$ denotes a relative offset value for RI transmission shown in FIG. 11. The case in which $M_{RI}=4$ and $N_{offset,RI}=-1$ is illustrated in FIG. 12.

Figure 13:
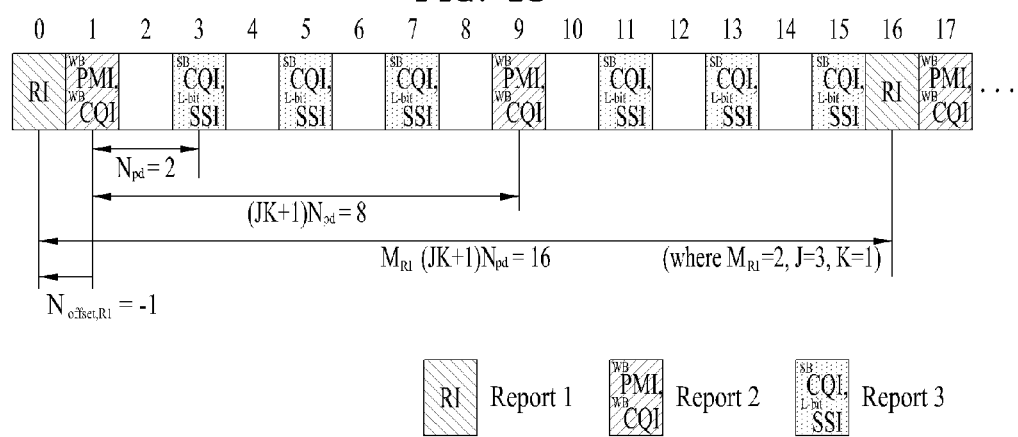

FIG. 13 illustrates CSI feedback in the case of Mode 2-1 of FIG. 8.

Referring to FIG. 13, CSI feedback is comprised of three types of report content, i.e. transmission of Report 1, transmission of Report 2, and transmission of Report 3. More specifically, an RI is transmitted through Report 1, a WB PMI and a WB CQI are transmitted through Report 2, and an SB CQI and an L-bit Subband Selection Indicator (SSI) are transmitted through Report 3. Report 2 or Report 3 is transmitted in subframe indexes satisfying ($10*n_f$+floor($n_s$/2))−$N_{offset,CQI}$)mod($N_{pd}$)=0. Especially, Report 2 is transmitted in subframe indexes satisfying ($10*n_f$+floor($n_s$/2))−$N_{offset,CQI}$)mod(H*$N_{pd}$)=0. Accordingly, Report 2 is transmitted at an interval of H*$N_{pd}$ and subframes between contiguous Reports are filled with transmission of Report 3. At this time, H equals to J*K+1 wherein J is the number of BPs. K is a value indicating how many full cycles will be consecutively performed, wherein the full cycle is a cycle during which a process for selectively transmitting a subband once per different BP over all BPs. K is determined by higher layer signaling. The case in which $N_{pd}$=2, J=3, and K=1 is illustrated in FIG. 13. Report 1 is transmitted in subframe indexes satisfying ($10*n_f$+floor($n_s$/2)−$N_{off,CQI}$−$N_{offset,RI}$)mod($M_{RI}$*(J*K+1)*$N_{pd}$)=0. The case in which $M_{RI}$=2 and $N_{offset,RI}$=−1 is illustrated in FIG. 13.

FIG. 14(a) and FIG. 14(b) illustrate periodic reporting of CSI which is being discussed in LTE-A. If an eNB includes 8 Tx antennas in Mode 2-1, then a 1-bit indicator, i.e. a Precoder Type Indication (PTI) parameter, is configured and periodic reporting modes classified into two types according to the PTI value are considered. FIG. 14(a) illustrates CSI feedback in the case of Mode 2-1 regarding the PTI value 0, and FIG. 14(b) illustrates CSI feedback in the case of Mode 2-1 regarding to PTI value 1. In FIGS. 14, W1 and W2 illustrate hierarchical codebooks described with reference to Equations 8 and 9. If both W1 and W2 are determined, a completed type of a precoding matrix W is determined by combining W1 and W2.

Referring to FIG. 14, in the case of periodic reporting, different contents corresponding to Report 1, Report 2, and Report 3 are reported according to different repetition periods. An RI and a 1-bit PTI value are reported through Report 1. A WB W1 (when PTI=0) or a WB W2 and a WB CQI (when PTI=1) are reported through Report 2. A WB W2 and a WB CQI (when PTI=0) or an SB W2 and an SB CQI (when PTI=1) are reported through Report 3.

Report 2 and Report 3 are transmitted in subframes (for convenience, referred to as a first subframe set) having subframe indexes satisfying ($10*n_f$+floor($n_s$/2)−$N_{offset,CQI}$)mod($N_C$)=0 wherein $N_{offset,CQI}$ is an offset value for PMI/CQI transmission shown in FIG. 9 and $N_c$ denotes a subframe interval between contiguous Reports 2 or Reports 3. The case in which $N_{offset,CQI}$=1 and $N_c$=2 is illustrated in FIG. 14. The first subframe set is comprised of subframes having odd-numbered indexes. $n_f$ denotes a system frame number (or radio frame index) and $n_s$ denotes a slot index in a radio frame. floor( ) indicates the floor function and 'A mod B' indicates a remainder obtained by dividing A by B.

Report 2 is located in some subframes in the first subframe set and Report 3 is located in the other subframes. More specifically, Report 2 is located in subframes having subframe indexes satisfying ($10*n_f$+floor($n_s$/2)−$N_{offset,CQI}$) mod (H*$N_c$)=0. Accordingly, Report 2 is transmitted at an interval of H*$N_c$ and one or more first subframes between contiguous Reports 2 are filled with transmission of Report 3. Referring to FIG. 14(a), if PTI=0, then H=M and M is determined by higher layer signaling. The case in which M=2 is illustrated in FIG. 14. Referring to FIG. 14(b), if PTI=1, then H=J*K+1, K is determined by higher layer signaling, and J is the number of BPs. In FIG. 14, J=3 and K=1.

Report 1 is transmitted in subframes having subframe indexes satisfying ($10*n_f$+floor($n_s$/2)−$N_{offset,CQI}$−$N_{offset,RI}$)mod($M_{RI}$*(J*K+1)*$N_c$)=0 wherein $M_{RI}$ is determined by higher layer signaling. $N_{offset,RI}$ indicates a relative offset value for an RI. In FIG. 14, $M_{RI}$=2 and $N_{offset,RI}$=−1. The transmission time points of Report 1 and Report 2 do not overlap because $N_{offset,RI}$=−1. When a UE calculates RI, W1, and W2, they are associated with each other. For example, W1 and W2 are calculated depending on RI and W2 is calculated depending on W1. A BS may be aware of a final W from W1 and W2 when both Report 2 and Report 3 are reported after Report 1 is reported.

Hereinafter, Cooperative Multipoint (CoMP) transmission/reception will be described.

In a system after LTE-A, a scheme for raising system performance by enabling cooperation between a plurality of cells is attempted. Such a scheme is called CoMP transmission/reception. CoMP refers to a scheme in which two or more eNBs, access points, or cells cooperatively communicate with a UE for smooth communication between a specific UE and an eNB, an access point, or a cell. In the present invention, eNB, access point, and cell may be used interchangeably.

In general, in a multi-cell environment in which a frequency reuse factor is 1, the performance of the UE located at a cell edge and average sector throughput may be reduced due to Inter-Cell Interference (ICI). In order to reduce ICI, a legacy LTE system uses a method of enabling the UE located at a cell edge to have appropriate throughput and performance using a simple passive scheme such as Fractional Frequency Reuse (FFR) through UE-specific power control in an environment restricted by interference. However, it is desirable that ICI be reduced or the UE reuse ICI as a desired signal, rather than decreasing the use of frequency resources per cell. In order to accomplish the above purpose, a CoMP transmission scheme may be employed.

Figure 15:
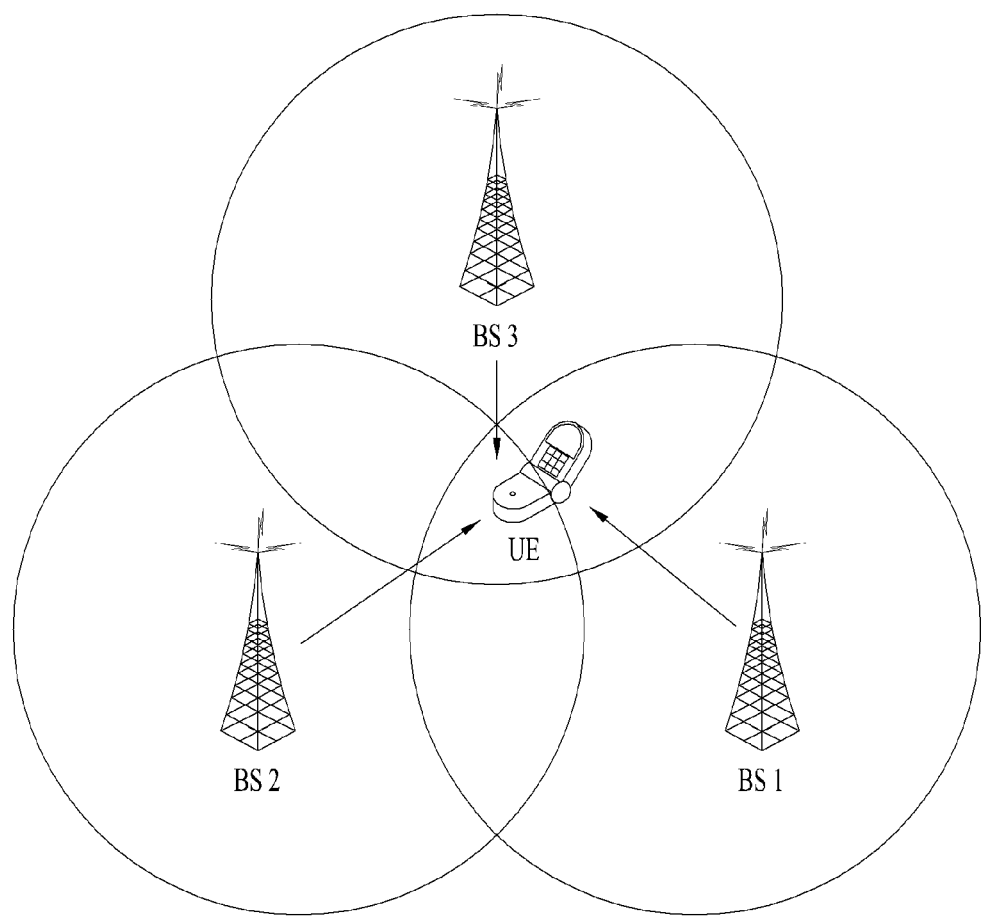
FIG. 15 illustrates an example of performing CoMP.

FIG. 15 illustrates an example of performing CoMP. Referring to FIG. 15, a radio communication system includes a plurality of eNBs eNB1, eNB2, and eNB3 that perform CoMP and a UE. The plural eNBs eNB1, eNB2, and eNB3 for performing CoMP may efficiently transmit data to the UE through cooperation.

A CoMP transmission scheme may be divided into CoMP-Joint Processing (CoMP-JP) which is a cooperative MIMO type of JP through data sharing and CoMP-Coordinated Scheduling/Coordinated Beamforming (CoMP-CS/CB).

In the case a CoMP-JP scheme in downlink, a UE may simultaneously receive data from a plurality of eNB implementing the CoMP transmission scheme and may improve reception performance by combining signals received from the respective eNBs (Joint Transmission (JT)). In addition, a method in which one of a plurality of eNBs performing the CoMP transmission scheme transmits data to the UE at a specific time point may be considered (Dynamic Point Selection (DPS). In a CoMP-CS/CB scheme in downlink, the UE may instantaneously receive data through one eNB, i.e. a serving eNB by beamforming.

If the CoMP-JP scheme is applied in uplink, a plurality of eNBs may simultaneously receive a PUSCH signal from the UE (Joint Reception (JR)). In the case of CoMP-CS/CB in uplink, only one eNB may receive a PUSCH signal. Cooperative cells (or eNBs) may determine to use the CoMP-CS/CB scheme.

A UE using the CoMP transmission scheme, i.e. a CoMP UE, may feed back channel information feedback (hereinafter, CSI feedback) to a plurality of eNBs performing the CoMP transmission scheme. A network scheduler may select a proper CoMP transmission scheme capable of raising a transmission rate among the CoMP-JP, CoMP-CS/CB, and DPS schemes based on CSI feedback. To this end, a periodic feedback transmission scheme using a PUCCH may be used as a method in which the UE configures CSI feedback in a plurality of eNBs performing the CoMP transmission scheme. In this case, feedback configurations for the eNBs may be independent of one another. Accordingly, in the disclosure according to an embodiment of the present invention, an operation of feeding back CSI with such an independent feedback configuration is referred to as a CSI process. One or more CSI processes may be performed in one serving cell.

Figure 16:
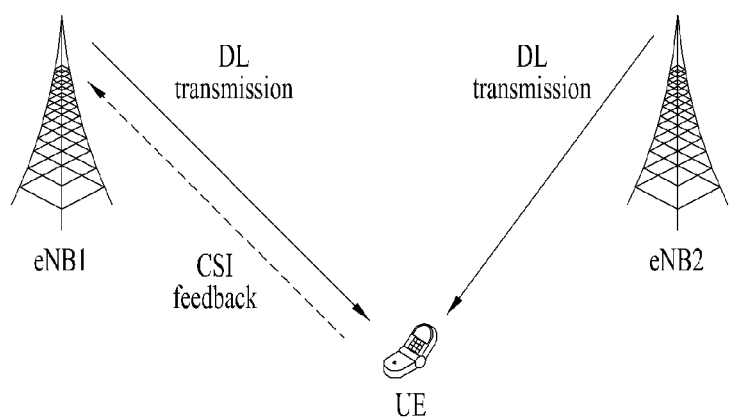
FIG. 16 illustrates a downlink CoMP operation.

FIG. 16 illustrates a downlink CoMP operation.

In FIG. 16, a UE is positioned between an eNB1 and an eNB2 and the two eNBs, i.e. eNB1 and eNB2, perform a proper CoMP operation such as JT, DCS, or CS/CB to solve a problem of interference to the UE. To aid in the CoMP operation of the eNBs, the UE performs proper CSI feedback. Information transmitted through CSI feedback includes PMI and CQI of each eNB and may additionally include channel information between the two eNBs (e.g. phase offset information between two eNB channels) for JT.

In FIG. 16, although the UE transmits a CSI feedback signal to the eNB1 which is a serving cell thereof, the UE may transmit the CSI feedback signal to the eNB2 or the two eNBs, according to situation. In addition, in FIG. 16, while the eNBs are described as a basic unit participating in CoMP, the present invention may be applied to CoMP between Transmission Points (TPs) controlled by a single eNB.

That is, for CoMP scheduling in a network, the UE should feed back not only downlink CSI of a serving eNB/TP but also downlink CSI of a neighboring eNB/TP. To this end, the UE feeds back a plurality of CSI processes reflecting various interference environments of eNBs/TPs for data transmission.

Accordingly, an Interference Measurement Resource (IMR) is used to measure interference during CoMP CSI calculation in an LTE system. A plurality of IMRs may be configured for one UE and each of the plural IMRs may be independently configured. That is, the period, offset, and resource configuration of the IMR are independently determined and may be signaled by an eNB to a UE using higher layer signaling (RRC etc.).

In addition, a CSI-RS is used to measure a channel desired for CoMP CSI calculation in the LTE system. A plurality of CSI-RSs may be configured for one UE and each of the CSI-RSs in independently configured. Namely, each CSI-RS includes an independently configured period, offset, resource configuration, power control, and the number of antenna ports and information related to the CSI-RS is signaled to the UE from the eNB through higher layer signaling (RRC etc.).

Among a plurality of CSI-RSs and a plurality of IMRs configured for a UE, one CSI process may be defined in association with one CSI-RS resource for signal measurement and one IMR for interference measurement. The UE feeds back CSI having different periods and subframe offsets, derived from different CSI processes, to a network (e.g. eNB).

That is, each CSI process has an independent CSI feedback configuration. The eNB may signal the CSI-RS resource, IMR association information, and CSI feedback configuration to the UE through higher layer signaling (e.g. RRC signaling, etc.) on a CSI process basis. For example, it is assumed that three CSI processes as shown in Table 1 are configured for the UE.

TABLE 1

| CSI Process | Singnal Measurement Resource (SMR) | IMR |
| --- | --- | --- |
| CSI process 0 | CSI-RS 0 | IMR 0 |
| CSI process 1 | CSI-RS 1 | IMR 1 |
| CSI process 2 | CSI-RS 0 | IMR 2 |

In Table 1, CSI-RS 0 and CSI-RS 1 indicate a CSI-RS received from an eNB 1 which is a serving eNB of the UE and a CSI-RS received from an eNB 2 which is a neighboring eNB participating in cooperation. It is assumed that IMRs configured for the CSI processes of Table 1 are configured as shown in Table 2.

TABLE 2

| IMR | eNB 1 | eNB 2 |
| --- | --- | --- |
| IMR 0 | Muting | Data transmission |
| IMR 1 | Data transmission | Muting |
| IMR 2 | Muting | Muting |

In IMR 0, the eNB 1 performs muting, the eNB 2 performs data transmission, and the UE is configured to measure interference of eNBs except for the eNB 1 from IMR 0. Similarly, in IMR 1, the eNB 2 performs muting, the eNB 1 performs data transmission, and the UE is configured to measure interference of eNBs except for the eNB 2 from IMR 1. In addition, in IMR 2, both the eNB 1 and eNB2 perform muting and the UE is configured to measure interference of eNBs except for the eNB1 and eNB 2 from IMR 2.

Accordingly, as shown in Table 1 and Table 2, CSI of CSI process 0 indicates optimal RI, PMI, and CQI when data is received from the eNB 1. CSI of CSI process 1 indicates optimal RI, PMI, and CQI when data is received from the eNB 2. CSI of CSI process 2 indicates optimal RI, PMI, and CQI, when data is received from the eNB 1 and there is no interference from the eNB 2.

In this way, it is desirable that CSI processes configured for one UE share a dependent value for the purpose of CoMP scheduling. For example, in the case of JT of a TP 1 and JT of a TP 2, if CSI process 1 considering a channel of the cell/TP 1 as a signal part and CSI process 2 considering a channel of the TP 2 as a signal part are configured for one UE, ranks and selected subband indexes of CSI process 1 and CSI process 2 should be the same to facilitate JT scheduling.

FIG. 17 illustrates multi-CSI feedback of a UE for cooperation between two eNBs.

In FIG. 17, it is assumed that the UE performs CSI feedback per subband. The UE may divide all bandwidths into N subbands, select M subbands having a good channel state, and report PMIs and/or CQIs for the M subbands (where N and M are natural numbers, N>M).

The UE for reporting CSI for CoMP performs CSI reporting per eNB. However, since channel environments from eNBs are different, how M subbands should be selected is problematic. For example, if the UE observes a good channel from an eNB1 and a weak channel from an eNB2, in a specific subband (e.g. subband K), it is ambiguous whether it is better to include the corresponding subband (subband K) in CSI reporting. Furthermore, since reference for selecting a subband varies with a CoMP scheme to be used by a network, the reference needs to be determined.

Referring to FIG. 17 (e.g. in the case of JT), since a UE simultaneously receives a signal thereof from two eNBs, the UE may preferably select M subbands indicating good quality of channels combined from the two eNBs. If the subbands selected by the UE for the two eNBs are not equal, a specific subband may frequently have only PMI/CQI for a channel of one of the two eNBs and, therefore, effective JT cannot be performed.

Accordingly, the UE may be configured to select M common subbands and report PMIs/CQIs for the two eNBs with respect to the selected subbands. That is, the UE may identically configure a set of subbands in which the UE reports PMIs/CQIs for the two eNBs. For example, the UE may select subbands 0, 2, and 5 for channels of the eNB1 and eNB2 and report PMI/CQI for each of the eNB1 and eNB2 (under assumption that N=6 and M=3).

Therefore, if subbands to be reported to the two eNBs are identically configured as shown in FIG. 17, the UE need report information for subband selection only once, thereby reducing feedback overhead. In addition, the UE may use a bit for reporting second subband selection information for another purpose (e.g. for report of a wideband PMI/CQI).

In the present invention, an additional operation of a UE necessary for applying a common subband according to a subband CSI feedback scheme of current LTE will be described hereinbelow. The proposal of the present invention is not restricted to LTE and the additional operation of the UE may be identically applied to other communication technologies using the common subband.

Figure 18:
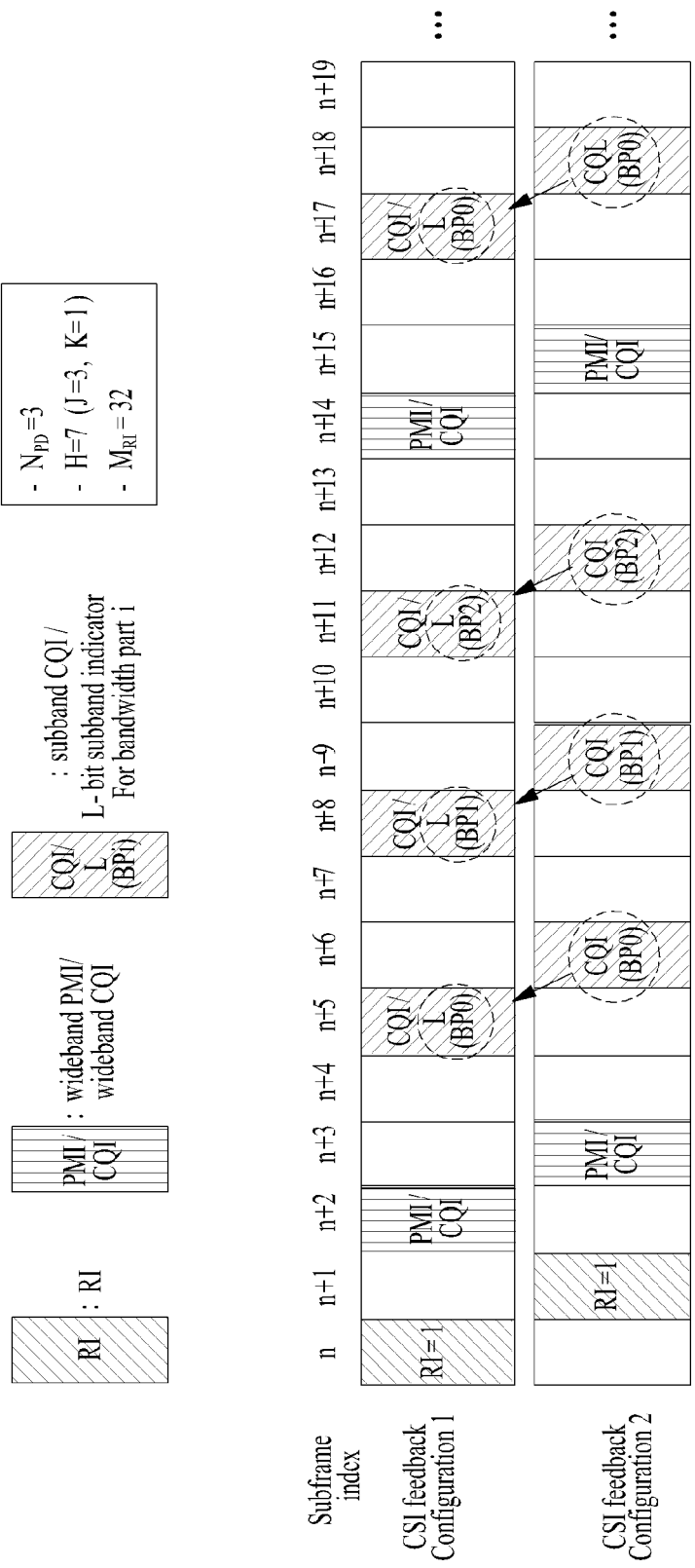
FIG. 18 illustrates a multi-CSI feedback operation of a UE using a common subframe for cooperation between two eNBs.

FIG. 18 illustrates a multi-CSI feedback operation of a UE using a common subframe for cooperation between two eNBs.

In FIG. 18, it is assumed that a CSI feedback configuration 1 for transmitting CSI of an eNB 1 and a CSI feedback configuration 2 for transmitting CSI of eNB 2 are configured for a UE. Although a situation in which two cells cooperatively perform communication will be described below for convenience of description, it is apparent that the present invention can be applied to the case in which a plurality of TPs cooperatively performs communication.

Among multiple CSI feedback configurations, a CSI feedback configuration for a common subband may be configured by CSI feedback using a higher layer signal such as an RRC signal, designated by an eNB to a UE, by CSI feedback generated from the lowest Non-Zero Power (NZP) CSI-RS index, or by CSI feedback generated from the lowest NZP CSI-RS index and the lowest IMR index. In addition, the other CSI feedback configurations are determined based on common subband information.

If the period and offset of each CSI feedback configuration are appropriately adjusted such that the BP of the CSI feedback configuration 1 is aligned with the BP of the CSI feedback configuration 2, a common subband may be applied as in a conventional operation performed by legacy UE.

Referring to FIG. 18, after a subframe in which a subband CQI of an i-th BP in the CSI feedback configuration 1 is fed back, if the subband CQI of the i-th BP having the same index in CSI feedback configuration 2 is fed back, the UE generates the subband CQI by applying the latest reported common subband to the CSI feedback configuration 2 without considering order of BPs.

That is, since subframes in which BPs have already been transmitted are aligned in the two CSI feedback configurations of periodic PUCCH mode 2-1, the UE reports the subband CQI by applying the latest feedback subband index in the CSI feedback configuration 1 to the CSI feedback configuration 2.

Accordingly, the eNB may properly adjust the offsets and periods of multiple CSI feedback configurations so that BPs in the CSI feedback configurations may be aligned.

In addition, according to the present invention, an L-bit subband indicator in a specific CSI feedback configuration may be configured to be identically transmitted or to be omitted, with respect to an L-bit subband indicator used for signaling a proper subband index (best subband index) in a BP For example, in FIG. 18, the CSI feedback configuration 1 is configured to report subband CQIs and subband indexes in subframes n+5, n+8, and n+11 for BPs 0, 1, and 2 and the CSI feedback configuration 2 is configured to report subband CQIs for BPs 0, 1, and 2 in subframes n+6, n+9, and n+12. In this case, subbands in the CSI feedback configuration 2 may be configured to be the same as subbands (i.e. subframes n+5, n+8, and n+11) reported according to the aligned CSI feedback configuration 1. That is, if a process according to the CSI feedback configuration 1 is configured as a reference process, a process according to the CSI feedback configuration 2 may be configured to feed back an L-bit subband indicator used in the reference process.

Although it has been assumed that L-bit information for a CSI feedback configuration in which a common subband is not transmitted is not fed back, the same L-bit information as that of a common subband of a corresponding BP may be fed back even in the CSI feedback configuration in which the common subband is not transmitted.

Figure 19:
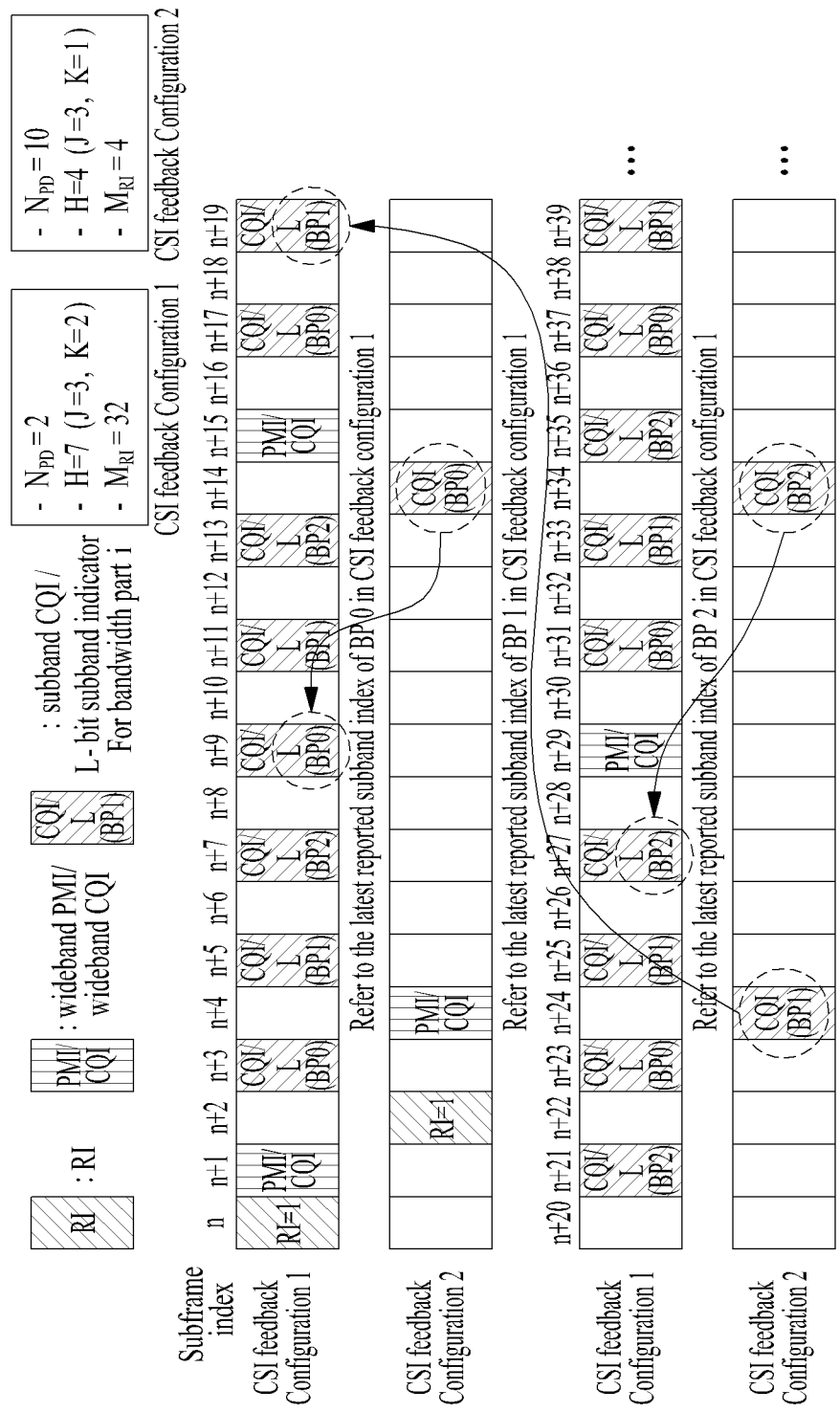
FIG. 19 illustrates the case in which orders of BPs are not aligned due to different periods of CSI feedback configurations.

FIG. 19 illustrates the case in which orders of BPs are not aligned due to different periods of CSI feedback configurations.

Referring to FIG. 19, if a subband of a CSI feedback configuration 2 is configured as a common subband most recently transmitted through a CSI feedback configuration 1, since reference for the subband of the CSI configuration 2 is made to subband indexes for other BPs, severe performance degradation may occur.

According to the present invention, the UE may apply a common subband in consideration of a BP index upon generating multiple CSI for the command subband. That is, a CQI for the latest reported common subband in the same BP may be configured.

For example, if a CQI of an i-th BP is reported in the CSI feedback configuration 2, the UE may use the most recently transmitted information out of L-bit control information of the i-th BP reported through the CSI feedback configuration 1. Namely, the UE may refer to or use subband indexes which are fed back in subframes n+9, n+19, and n+27 of the CSI feedback configuration 1 in order to calculate subband CQIs of BPs 0, 1, and 2 which are fed back in subframes n+14, n+24, and n+34 of the CSI feedback configuration 2.

Accordingly, the UE may store an index of the latest reported common subband per BP for reference.

That is, in FIG. 19, the UE calculates the CQIs of the CSI feedback configuration 2 with reference to a common subband prior to prescribed subframes and, thus, the UE should store a common subband index in the memory for a long time in order to refer to the common subband prior to the prescribed subframes. In the present invention, the common subband index is defined as a subframe index for a common subband.

However, if the common subband index or information related thereto is stored for a long time, the probability of losing the common subband index is increased while other information is stored in the memory and the common subband may not be effective any more due to channel aging.

Therefore, when the common subband index is stored for a long time, it is preferable that the UE sets a CQI of a corresponding BP as the lowest value. This is because, if the UE feeds back a CQI for an arbitrary subband in a state having no common subband index information, since the eNB recognizes the fed back CQI as a CQI for a common subband, the UE and eNB assume different subbands and thus incorrect scheduling between the UE and eNB may be performed.

That is, the UE may be configured to feed back the lowest CQI with respect to a common subband index stored for a long time so that the eNB may determine that quality of a channel transmitted with the lowest CQI is not good, thereby lowering possibility of scheduling to a specific channel.

Alternatively, the UE may select a subband having the lowest channel strength based on a Signal-to-Interference-plus-Noise Ratio (SINR) to feed back a CQI and subband index of the selected subband.

Accordingly, in order to prevent incorrect scheduling between the UE and the eNB, it is desirable that the eNB guarantee common subband reference always within a predetermined number of subframes by appropriately setting the offset and period of a CSI feedback configuration.

In the present invention, the eNB and the UE may determine whether to generate CSI by applying a common subband using a SubFrame Threshold (SFT) as an embodiment for feeding back multiple CSI using the common subband.

That is, when a common subband index is within the SFT, a CQI may be calculated with reference to a subband corresponding to the common subband index and feedback of an L-bit subband indicator may be omitted. If the common subband index is not within the SFT, a new subband may be selected by reflecting a current channel state in a BP and the L-bit subband indicator may be fed back together with the CQI.

For example, in a state that a CSI feedback configuration 1 (hereinafter, CFC 1) and a CSI feedback configuration 2 (hereinafter, CFC 2) are set, if a common subband report is configured through higher layer signaling such that the CFC 1 may report a subband index and the CFC 2 may not report the subband index, the UE may assume that a reporting subframe of the CFC 1 and a reporting subframe of the CFC 2 for the same BP are within a prescribed number of subframes or that the reporting subframe of the CFC 2 is within a prescribed number of subframes after the reporting subframe of the CFC 1.

Furthermore, in the present invention, an SFT may be configured according to time at which a subframe characteristic is changed due to channel aging, based on UE mobility and channel change rate. If the SFT is determined by the eNB, the SFT may be semi-statically indicated to the UE through higher layer signaling such as RRC. Alternatively, the UE may determine the SFT and signal the SFT to the eNB. If the UE determines the SFT, it is preferable to determine the SFT by additionally considering buffer size.

Figure 20:
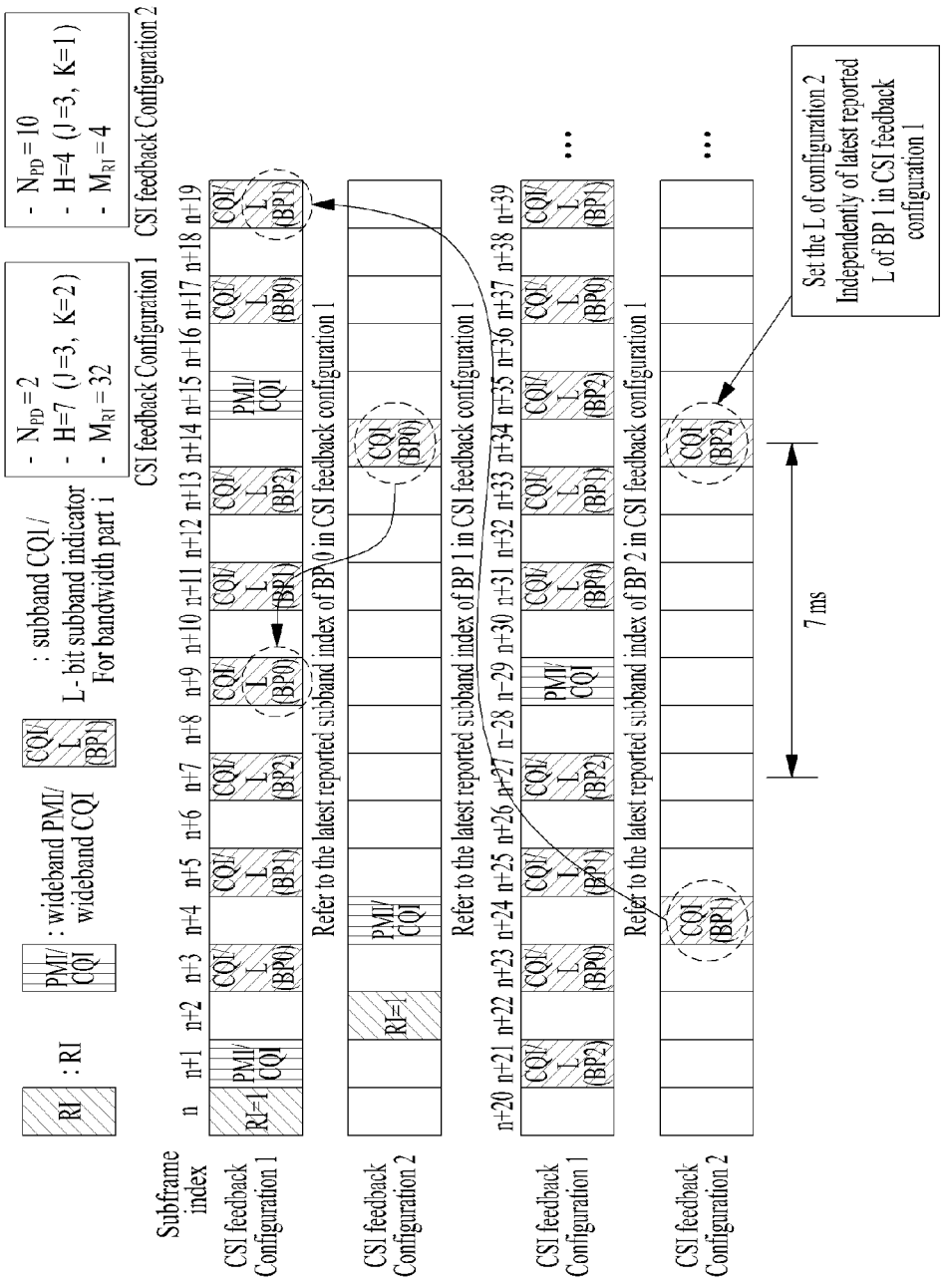
FIG. 20 illustrates an embodiment of feeding back multiple CSI using a common subband by applying an SFT according to the present invention.

FIG. 20 illustrates another embodiment of feeding back multiple CSI using a common subband by applying an SFT according to the present invention.

For example, if an SFT is set to 5, subband CQIs fed back in subframes n+14 and n+24 of a CFC 2 are calculated using corresponding common subbands because subframe indexes of the common subbands are within 5 subframes starting from a feedback time point. An L-bit subband indicator in the CFC 2 may be omitted. However, for a subband CQI which is fed back in a subframe n+34 of the CFC 2, a new subband is selected by reflecting a current channel state and a corresponding L-bit subband indicator is fed back together with the CQI, because a corresponding common subband index is not within 5 subframes.

Figure 21:
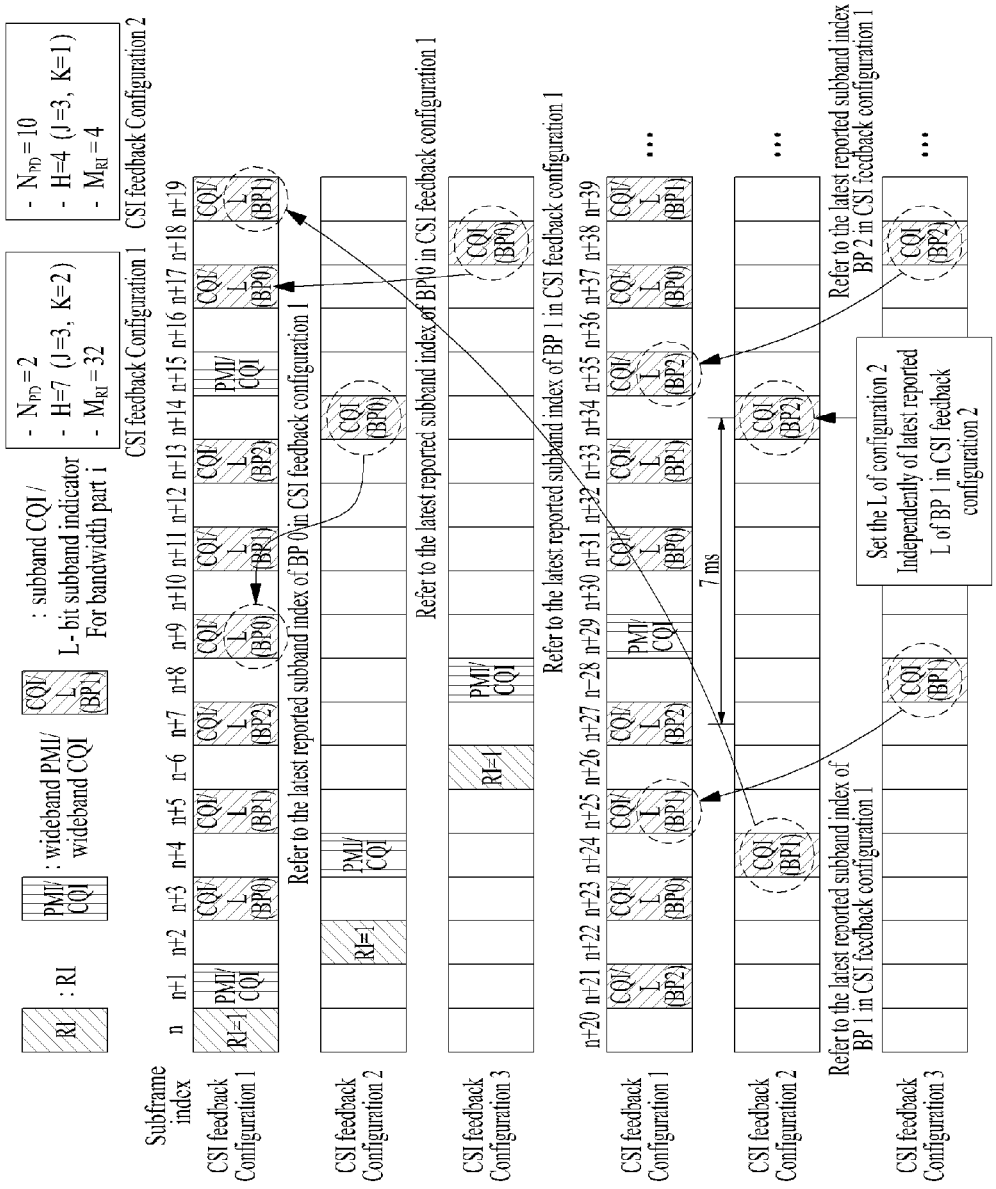
FIG. 21 illustrates an embodiment of feeding back a common subband through a specific CSI feedback configuration when there are three CSI feedback configurations for CoMP according to the present invention.

FIG. 21 illustrates an embodiment of feeding back a common subband through a CFC 1 when there are three CSI feedback configurations for CoMP according to the present invention. It is assumed that a CFC 1, a CFC 2, and a common subband of the two CFCs are the same as those of FIG. 20. In a CFC 3, since the common subband is within 5 subframes set as an SFT, an additional L-bit subband indicator is not fed back.

That is, if one reference CFC for feeding back a common subband is present and a plurality of CFCs for omitting feedback of an L-bit subband indicator by applying the common subband is configured for one UE, an independent SFT per CFC may be applied.

Referring to FIG. 21, if an index time point of a common subband in a BP 2 of the CFC 2 exceeds an SFT and an index time point of a common subband in a BP 2 of the CFC 3 is within the SFT, the UE performs feedback such that the common subband is not applied in the BP 2 of the CFC 2 but the common subband is applied in the BP 2 of the CFC 3

Unlink FIG. 21, SFTs are dependently applied in a plurality of CFCs. That is, if one reference CFC for feeding back a common subband is present and a plurality of CFCs for omitting an L-bit subband indicator by applying the common subband are configured for one UE, SFTs may be dependently applied in the plurality of CFCs.

Figure 22:
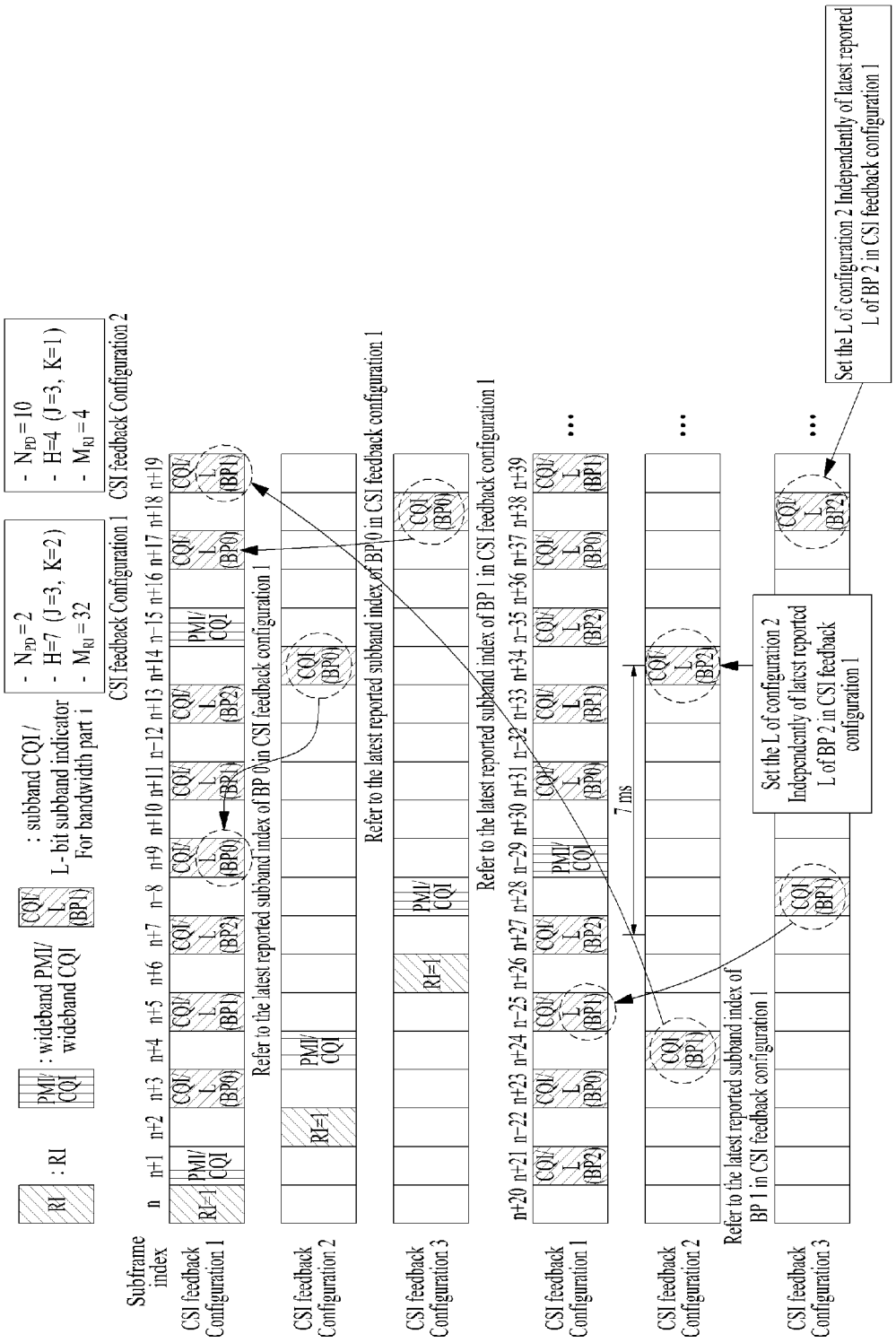
FIG. 22 illustrates an embodiment in which SFTs are dependently applied in a plurality of CFCs according to the present invention.

FIG. 22 illustrates an embodiment in which SFTs are dependently applied in a plurality of CFCs according to the present invention.

Referring to FIG. 22, since a common subband index time point is within an SFT in a BP 2 of a CFC 3 but exceeds the SFT in a BP 2 of a CFC 2, the UE may not apply a common subband both in the BP 2 of the CFC 2 and in the BP 2 of the CFC 3.

For example, if the SFT is set to 5 subframes, subband CQIs which are fed back in subframes n+14 and n+24 of the CFC 2 and subframes n+18 and n+28 of the CFC 3 are generated using a common subband and feedback of an L-bit subband indicator in the CFCs 2 and 3 may be omitted, because corresponding common subband indexes are within 5 subframes. However, for a subband CQI which is fed back in a subframe n+34 of the CFC 2, a new subband is selected by reflecting a channel state of the corresponding time point (i.e. subframe n+34) and a corresponding L-bit subband indicator is fed back together with a new CQI because a common subband index is not within 5 subframes. In this case, even though a common subband index corresponding to a subframe n+38 of the CFC 3 is present in a subframe n+35 of the CFC 1, an L-bit subband indicator is feedback together with the new CQI (for a reconfigured subband in the subframe n+34).

That is, if a common subband index time point corresponding to a specific BP of at least one CFC among a plurality of CFCs (i.e. the CFC 2 and CFC 3) except for a reference CFC (the CFC 1) exceeds an SFT, the plural CFCs (i.e. the CFC 2 and CFC 3) other than the reference CFC may select a new subband obtained by reflecting a channel state and feed back an L-bit subband indicator related to the selected subband together with CQI or omit the L-bit subband indicator.

Additionally, for system flexibility, an SFT may be set with reference to each CFC. At this time, whether to apply a common subband to each CFC may be independently determined.

If three or more CFCs are present, a common subband may be applied to a part of the CFCs and a subband using a conventional scheme may be applied to the other CFCs. For a CFC applying a subband using the conventional scheme, an unrealistically large value may be set as the SFT to perform the conventional subband scheme (i.e. a stored subband index may always be used).

The eNB may signal a 1-bit flag corresponding to each CFC to the UE using a bitmap scheme so that a common subband is applied to a CFC having a flag of 1 and the conventional subband scheme may be applied to a CFC having a flag of 0.

In the above-described embodiments, a common subband index is fed back in a specific CFC and the fed back common subband index is used for other CFCs. Additionally, the embodiments may be applied to the case in which a CFC which feeds back a common subband index based on an SFT is changed or reconfigured to feed back a CQI.

For example, assuming that a CFC 1 is initially designated to feed back a common subband index in a situation in which CFCs 1, 2, and 3 are configured according to the present invention, a common subband may be applied in the case in which the common subband index is effective based on an SFT in the CFC 2 or 3.

However, if the common subband index is not effective, a new common subband may be reconfigured in the CFCs 2 and 3 and information about the new common subband may be fed back.

Figure 23:
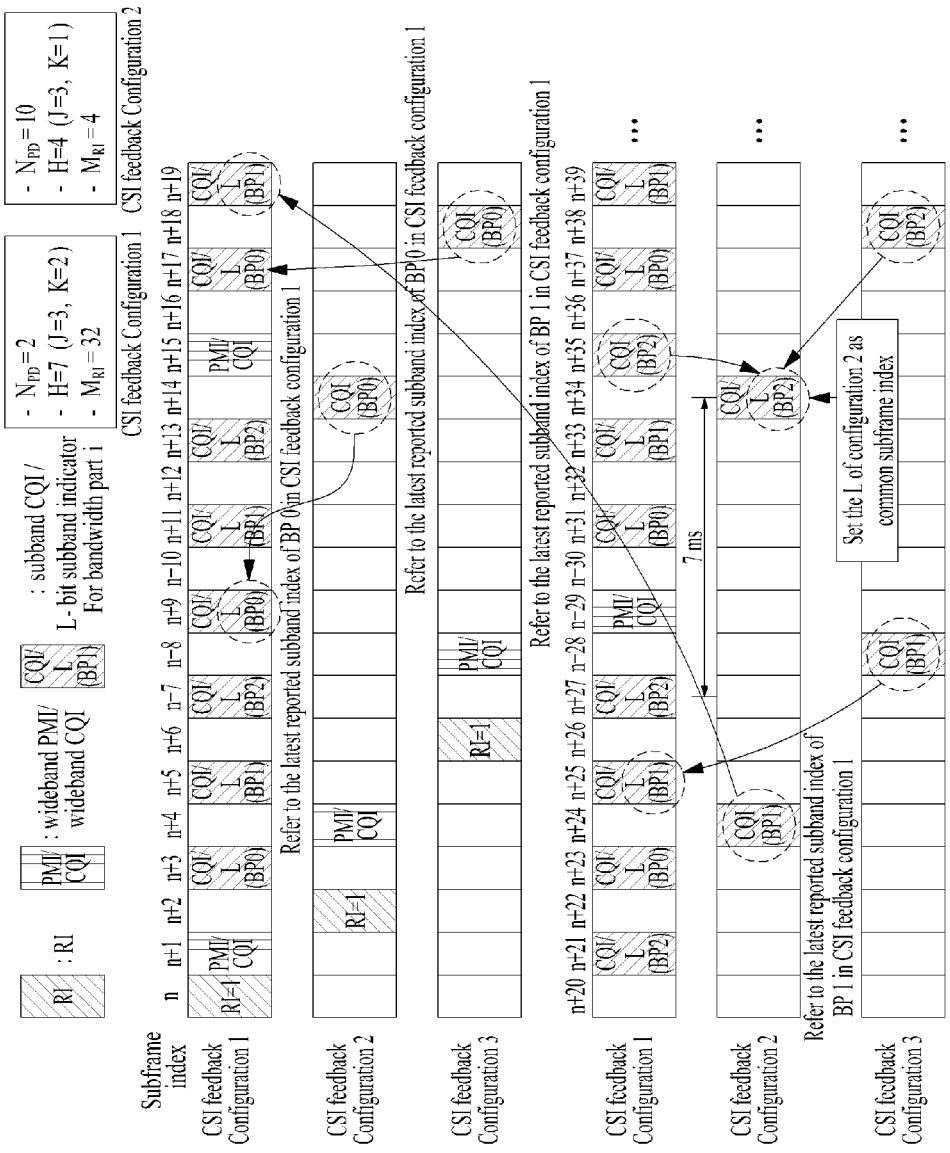
FIG. 23 illustrates an embodiment in which a CFC for feeding back a common subband index based on an SFT is changed according to the present invention.

FIG. 23 illustrates an embodiment in which a CFC for feeding back a common subband index based on an SFT is changed according to the present invention.

If it is assumed that CFCs in FIG. 23 are the same as those in FIG. 21, an effective common subband index is not present in an SFT (e.g. 5 subframes) in a subframe n+34 of a CFC 2. Accordingly, the UE reconfigures a new common subband reflecting a new channel state (i.e. subframe n+34) and performs CQI feedback using the newly configured common subband.

If a CFC is reconfigured, a CQI may be fed back using a newly reconfigured reference CFC (i.e. CFC 2). Accordingly, an SFT is applied to CFCs 1 and 3 based on a newly reconfigured common subband of the CFC 2 and, if the SFT is satisfied, a CQI is fed back according to the common subband. If the SFT is not satisfied again, a common subband reflecting a channel state in a CFC which does not satisfy the SFT is reconfigured and this value is referred to for the other CFCs.

In the illustrated case of FIG. 23, a CFC for feeding back a common subband is changed per BP. A common subband of a BP 2 after a subframe n+34 may be fed back through the CFC 2 and common subbands of BPs 0 and 1 may be fed back through the CFC 1. If a CFC for feeding back a common subband in an arbitrary BP is reconfigured, the common subband may be configured so as to be fed beck through the reconfigured CFCs even in the other BPs.

Even in the case of FIG. 23, if a common subband is applied as described above, feedback of an L-bit subband indicator may be omitted. However, the UE may feedback the same L value corresponding to the common subband without omitting a value related to the L-bit subband indicator. Even in this case, the UE feeds back the same L value as a common subband index when an effective common subband index is present as a result of determination based on an SFT and, otherwise, the UE may feedback a subband index corresponding to a new subband obtained by reflecting a current channel state and a CQI. Furthermore, when the same L value is fed back, the fed back subband index may be applied only to a corresponding CFC or may be a common subband.

The multi-CSI feedback scheme using a common subband according to the present invention may be restricted to the case in which multi-CSI feedback based on the same Component Carrier (CC) is performed. That is, if multiple CSI is configured based on different CCs as in a Carrier Aggregation (CA) environment, the multi-CSI feedback scheme using a common subband according to the present invention may be limited such that the scheme may be applied to CSI using the same CC. Similarly, even if a part of multiple CSI is configured based on the same CC and the other part thereof is configured based on different CCs as in a hybrid situation of CA and CoMP, the present invention may be applied only to CSI using the same CC.

The multi-CSI feedback scheme using a common subband according to the present invention may be extended and applied to transmission of a common RI.

First, the case in which an SFT is used and a CFC for transmitting a common RI is fixed is described. A CFC for transmitting a common RI among a plurality of CFCs may be configured as CSI feedback designated using a higher layer signal such as RRC from the eNB to the UE, as CSI feedback generated from a lowest NZP CSI-RS index, or as CSI feedback generated from a lowest NZP CSI-RS index and a lowest IMR index.

Figure 24:
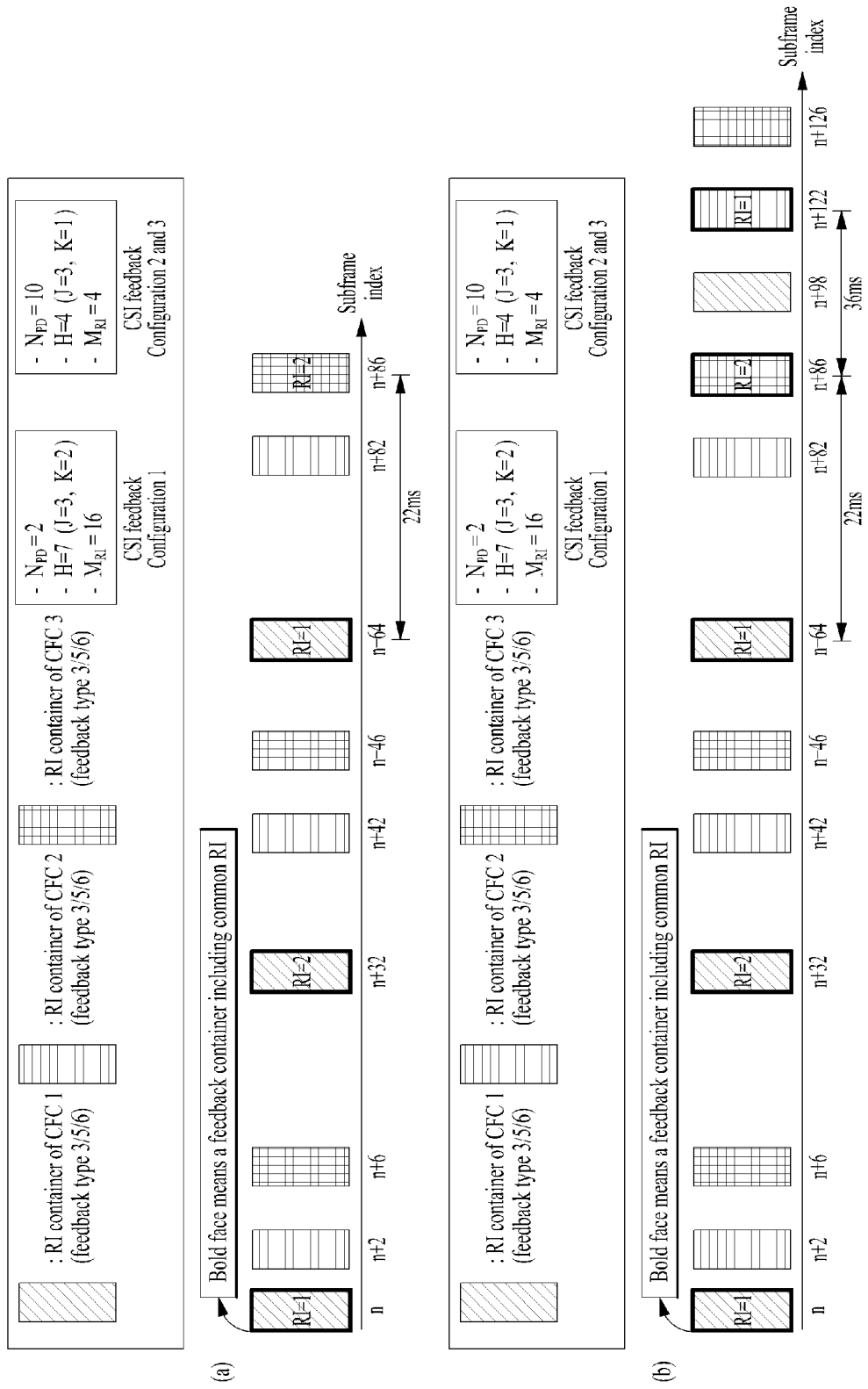
FIG. 24(a) and FIG. 24(b) illustrate use of a common RI for multiple CSI feedback according to the present invention.

In FIG. 24, it is assumed that there are three CFCs and a common RI is transmitted through a CFC 1. Although PMI/CQI other than RI is not shown, PMI/CQI is assumed to be fed back according to a period and an offset.

The UE calculates a common RI at a period of 32 subframes through the CFC 1 and feeds back the common RI through an RI container. CFCs 2 and 3 include RI containers at a period of 40 subframes. The RI containers may be feedback types 3, 5, and 6 defined in LTE and are transmitted together with a PTI, a wideband PMI, etc. (That is, although only the RI is shown in FIG. 24 for convenience of description, it is assumed that the PTI and wideband PMI may be conveyed within the container.)

In FIG. 24(a), if an SFT is set to 20 subframes, RI feedback in subframes n+2 and n+6 is omitted and subsequent PMI/CQI which is fed back through CFCs 2 and 3 is generated based on a common RI transmitted in a subframe n until the next RI container is configured (i.e. until a subframe n+42 in the CFC 2 and a subframe n+46 in the CFC 3).

Similarly, RI feedback in subframes n+42 and n+46 within 20 subframes starting from a subframe n+32 is omitted and subsequent PMI/CQI which is fed back through the CFCs 2 and 3 is generated based on a common RI transmitted in the subframe n+32 until the next RI container is configured (i.e. until the subframe n+42 in the CFC 2 and the subframe n+46 in CFC 3).

However, in association with a subframe n+64, RI feedback of a subframe n+82 is omitted and subsequent PMI/CQI which is fed back through the CFC 2 is generated based on a common RI transmitted in the subframe n+64 until the next RI container is configured (i.e. until a subframe n+122). However, since a common RI in a subframe n+86 of the CFC 3 is not present within an SFT of 20 subframes, the UE determines that there is no an effective common RI and transmits a new RI obtained by reflecting a channel state. PMI/CQI after the subframe n+86 is calculated based on an RI value transmitted in the subframe n+86 until the next RI container is configured (i.e. until a subframe n+166).

Further, a value for a common RI and a value for a common subband may be independently configured and an SFT may be signaled through higher layer signaling (e.g. RRC). Since an RI value is mainly configured based on long-term channel statistics, it is effective that an SFT for the common RI is set to be greater than an SFT for the common subband.

FIG. 24(a) and FIG. 24(b) illustrate embodiments of independently applying a common RI according to CFC wherein the common RI is not applied to the CFC 3 and is applied to the CFC 2 in a situation in which the CFC 3 has no effective common RI (i.e. subframe 86) and the CFC 2 has an effective common RI (i.e. subframe 82). Alternatively, when a plurality of CFCs for referring to the common RI is present, if there is no CFC having an effective common RI, individual RIs may be calculated and fed back as in a conventional scheme, without applying the common RI to all CFCs until a new common RI is configured.

Hereinafter, an embodiment of changing CFCs for transmitting a common RI using an SFT will be described.

According to FIG. 24(a), it is assumed that a CFC 1 is designated to feed back a common RI in a situation in which CFCs 1, 2, and 3 are configured. In this case, if the common RI is effective based on an SFT in the CFC 2 or 3, the common RI can be applied as in FIG. 24(a). However, if the common RI is not effective, a new RI may be configured and fed back in a corresponding CFC.

An embodiment of changing a CFC for feeding back a common RI based on an SFT will now be described with reference to FIG. 24(b).

Although CFCs in FIG. 24(b) are the same as those in FIG. 24(a), an effective common RI is not present within an SFT (e.g. 20 subframes) in a subframe n+86 of a CFC 3. Therefore, a new common RI is configured by reflecting a channel state and a newly configured value is fed back. In CFCs 1 and 2 after the subframe n+86, an SFT is applied based on the newly configured common RI of the CFC 3. If the SFT of 20 subframes is satisfied, PMI/CQI may be fed back according to the common RI. If the SFT is not satisfied again, a new common RI is reconfigured in a corresponding CFC and this value is used in the other CFCs.

That is, in the CFC 1 after the subframe n+86, PMI/CQI is calculated with reference to a common RI of the subframe n+86 until the next common RI is configured. Since an SFT in a subframe n+122 does not satisfy 20 subframes, a new common RI is fed back and PMI/CQI may be fed back in the CFCs 1 and 3 based on a newly configured value (i.e. a configured value in the subframe n+122) until the next common RI is configured.

The common RI transmission scheme of the present invention may be restricted to the case in which multi-CSI feedback based on the same CC is performed. That is, if multiple CSI is configured based on different CCs as in a CA environment, the common RI transmission scheme according to the present invention may be limited such that the scheme may be applied only to CSI using the same CC. Similarly, even if a part of multiple CSI is configured based on the same CC and the other part is configured based on different CCs as in a hybrid situation of CA and CoMP, the present invention may be applied only to CSI using the same CC.

If the common RI is applied as described previously, RI feedback may be omitted in CFCs except for a CFC for feeding back the common RI and the same RI as the common RI may be fed back. Even in this case, if an effective common RI is present as a result of determination of the UE, the UE feeds back the same RI value as the common RI and, if not, the UE may feedback a new RI by reflecting a current channel state. Even when such an RI is fed back, the RI may be applied only to a corresponding CFC or a new RI may be configured.

If there are three or more CFCs, a common RI may be applied to some CFCs and an RI of a conventional scheme may be applied to the other CFCs. To this end, for a CFC applying an RI using the conventional scheme, an unrealistically large value may be set as the SFT to perform the conventional RI scheme.

Alternatively, the eNB may signal a 1-bit flag corresponding to each CFC to the UE using a bitmap scheme so that a common RI is applied to a CFC having a flag of 1 and the conventional RI scheme may be applied to a CFC having a flag of 0.

While the above-described embodiments of the present invention have been described in terms of a common RI and a selected common subband index, the present invention may be extended and applied to the case in which a common PMI is applied to different processes or the common PMI is applied to a subframe set 0 and a subframe set 1 of one CSI process.

That is, the UE may feedback the same PMI value as an effective common PMI when the effective common PMI is present as a result of determination based on an SFT and, otherwise, the UE may feedback a new PMI obtained by reflecting a current channel state. In this case, the fed back PMI may be limitedly applied only to a corresponding CFC or may be configured as a common PMI.

Accordingly, some of CSI processes configured for the UE may be restricted to have a common CSI value, that is, a common RI, PMI, or selected subband index.

In the present invention, a CSI process which is a reference for configuring a CSI value among CSI processes restricted to have a common CSI value is defined as a reference process and CSI processes except for the reference process are defined as linked processes.

The linked processes may feedback the same value as a CSI value of a specific reference process without additional calculation. For example, CSI of the linked processes is configured as the latest reported CSI of the reference process which is transmitted at or prior to a reporting time point of corresponding CSI.

While, in the above examples, the case in which the reference process and the linked processes share the common RI has been described, embodiments of present invention are not limited thereto and may be applied to the case of a common PMI or a common subband index.

Therefore, in the present invention, an RI of the linked process and an RI of a reference process are defined as a linked RI and a reference RI, respectively.

If the linked RI and reference RI are configured to have the same value, the UE may configure the linked RI to be reported within a prescribed time or prescribed subframes after the reference RI is reported. To this end, the eNB may determine the feedback periods and offsets of the reference RI and the linked RI so that the linked RI may be reported within a prescribed time (e.g. 5 ms) or prescribed subframes after the reference RI is reported.

Similarly, if a selected subband index of the linked process is configured to have the same value as a selected subband index of the reference process, the UE may be configured to report a selected subband index corresponding to a BP i of the linked process within a prescribed time (e.g. 5 ms) or prescribed subframes after the selected subband index corresponding to the BP i of the reference process is reported. To this end, the eNB may determine the feedback periods and offsets of a reference process CQI and a linked process CQI so that the selected subband index corresponding to the BP i of the linked process may be reported within a prescribed time (e.g. 5 ms) or prescribed subframes after the selected subband index corresponding to the BP i of the reference process is reported.

In addition, if a PMI of the linked process is configured to have the same value as a PMI of the reference process, the UE may be configured to report the PMI of the linked process within a prescribed time (e.g. 5 ms) or prescribed subframes after the PMI of the reference process is reported. Accordingly, the eNB may determine the feedback periods and offsets of the PMI of the reference process PMI and the PMI of the linked process so that the PMI of the linked process may be reported within a prescribed time (e.g. 5 ms) or prescribed subframes after the PMI of the reference process is reported FIG. 25 illustrates a BS and a UE which are applicable to the present invention.

If a wireless communication system includes a relay, communication in a backhaul link is performed between the BS and the relay and communication in an access link is performed between the relay and the UE. Accordingly, the BS and UE shown in FIG. 25 may be replaced with the relay according to situation.

Figure 25:
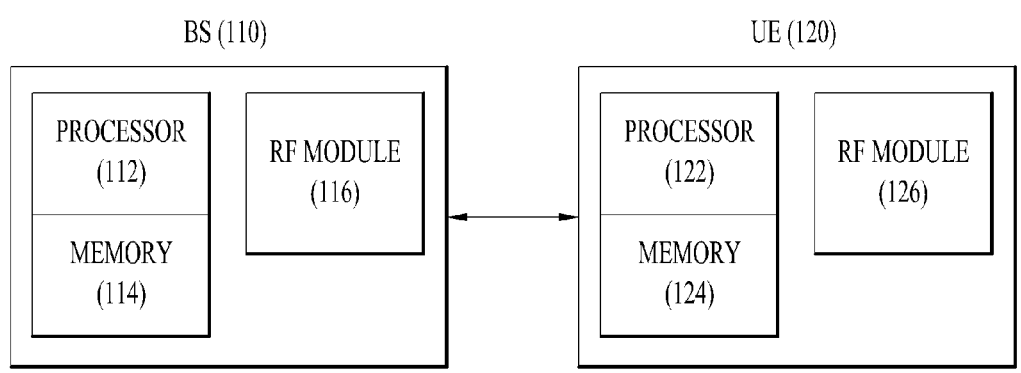
FIG. 25 illustrates a BS and a UE which are applicable to the present invention.

Referring to FIG. 25, a wireless communication system includes a BS 110 and a UE 120. The BS 110 includes a processor 112, a memory 114, and a Radio Frequency (RF) unit 116. The processor 112 may be configured so as to implement the procedures and/or methods proposed in the present invention. The memory 114 is connected to the processor 112 and stores various pieces of information related to operations of the processor 112. The RF unit 116 is connected to the processor 112 and transmits and/or receives RF signals. The UE 120 includes a processor 122, a memory 124, and an RF unit 126. The processor 122 may be configured so as to implement the procedures and/or methods proposed in the present invention. The memory 124 is connected to the processor 122 and stores various pieces of information related to operations of the processor 122. The RF unit 126 is connected to the processor 122 and transmits and/or receives RF signals. The BS 110 and/or the UE 120 may have a single antenna or multiple antennas.

The embodiments of the present invention described hereinabove are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in the embodiments of the present invention may be rearranged. Some constructions of any one embodiment may be included in another embodiment and may be replaced with corresponding constructions of another embodiment. It is obvious that claims that are not explicitly cited in each other in the appended claims may be presented in combination as an embodiment of the present invention or included as a new claim by subsequent amendment after the application is filed.

In this document, the embodiments of the present invention have been described centering on a data transmission and reception relationship between a UE and a BS. In some cases, a specific operation described as performed by the BS may be performed by an upper node of the BS. Namely, it is apparent that, in a network comprised of a plurality of network nodes including a BS, various operations performed for communication with a UE may be performed by the BS, or network nodes other than the BS. The term BS may be replaced with the terms fixed station, Node B, eNode B (eNB), access point, etc. The term UE may be replaced with the term Mobile Station (MS), Mobile Subscriber Station (MSS), etc.

The embodiments of the present invention may be achieved by various means, for example, hardware, firmware, software, or a combination thereof. In a hardware configuration, the embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present invention may be implemented in the form of a module, a procedure, a function, etc. For example, software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

Mode for Invention

Various embodiments have been described in the best mode for carrying out the invention.

INDUSTRIAL APPLICABILITY

While the method for reporting CSI in a wireless communication system and the apparatus therefor have been described focusing on examples applied to a 3GPP LTE system, the present invention is applicable to various wireless communication systems in addition to the 3GPP LTE system.

The invention claimed is:
1. A method for feeding back Channel State Information (CSI) using a common subband at a user equipment in a wireless communication system, comprising:
determining a prescribed SubFrame Threshold (SFT) based on a mobility of the user equipment and a channel change rate;
transmitting first CSI based on the common subband to at least one base station at a first transmission time point according to a first CSI feedback configuration;
determining whether or not a second transmission time point for transmitting second CSI is within the prescribed SFT;
generating the second CSI based on the common subband if the second transmission time point is within the prescribed SFT or based on a subband selected accord- ing to a channel state of the second transmission time point if the second transmission time point is not within the prescribed SFT; and transmitting the second CSI to the at least one base station at the second transmission time point according to a second CSI feedback configuration.

2. The method according to claim 1, further comprising:
transmitting third CSI to the at least one base station at a third transmission time point according to a third CSI feedback configuration,
wherein the third CSI is generated based on the common subband when the third transmission time point is within the prescribed SFT from the first transmission time point.

3. The method according to claim 2, wherein the second CSI and the third CSI are independently generated based on subbands selected according to CSI transmission time points of the second CSI and the third CSI, when at least one of the second transmission time point and the third transmission time point is not within the prescribed SFT from the first transmission time point.

4. The method according to claim 2, further comprising reconfiguring the common subband, when one of the second transmission time point and the third transmission time point is not within the prescribed SFT from the first transmission time point.

5. The method according to claim 1, wherein each of the first CSI and the second CSI includes at least one of a Channel Quality Indicator (CQI), a Precoding Matrix Indicator (PMI), and a Rank Indicator (RI).

6. The method according to claim 1, wherein each of the first CSI and the second CSI is CSI in associated with the same Bandwidth Part (BP).

7. A method for feeding back Channel State Information (CSI) using a common Rank Indicator (RI) at a user equipment in a wireless communication system, comprising:
determining a prescribed SubFrame Threshold (SFT) based on a mobility of the user equipment and a channel change rate;
transmitting first CSI based on a first common RI to at least one base station at a first transmission time point according to a first CSI feedback configuration;
determining whether or not a second transmission time point for transmitting second CSI is within the prescribed SFT;
generating the second CSI based on the first common RI if the second transmission time point is within the prescribed SFT or based on a second common RI configured according to a channel state of the second transmission time point if the second transmission time point is not within the prescribed SFT; and
transmitting the second CSI to the at least one base station at the second transmission time point according to a second CSI feedback configuration.

8. A User equipment for feeding back Channel State Information (CSI) using a common subband in a wireless communication system, comprising:
a Radio Frequency (RF) unit; and
a processor,
wherein the processor is configured to:
determine a prescribed SubFrame Threshold (SFT) based on a mobility of the user equipment and a channel change rate,
transmit first CSI based on the common subband to at least one base station at a first transmission time point according to a first CSI feedback configuration,
determine whether or not a second transmission time point for transmitting second CSI is within the prescribed SFT,
generate the second CSI based on the common subband if the second transmission time point is within the prescribed SFT or based on a subband selected according to a channel state of the second transmission time point if the second transmission time point is not within the prescribed SFT, and
transmit second CSI to the at least one base station at a second transmission time point according to a second CSI feedback configuration.

9. The user equipment according to claim 8, wherein the processor is configured to further transmit third CSI to the at least one base station at a third transmission time point according to a third CSI feedback configuration and wherein the third CSI is generated based on the common subband when the third transmission time point is within the prescribed SFT from the first transmission time point.

10. The user equipment according to claim 9, wherein the second CSI and the third CSI are independently generated based on subbands selected according to CSI transmission time points of the second CSI and the third CSI, when at least one of the second transmission time point and the third transmission time point is not within the prescribed SFT from the first transmission time point.

11. The user equipment according to claim 9, the processor is configured to reconfigure the common subband, when one of the second transmission time point and the third transmission time point is not within the prescribed SFT from the first transmission time point.

12. A user equipment for feeding back Channel State Information (CSI) using a common Rank Indicator (RI) in a wireless communication system, comprising:
a Radio Frequency (RF) unit; and
a processor,
wherein the processor is configured to:
determine a prescribed SubFrame Threshold (SFT) based on a mobility of the user equipment and a channel change rate,
transmit first CSI based on a first common RI to at least one base station at a first transmission time point according to a first CSI feedback configuration,
determine whether or not a second transmission time point for transmitting second CSI is within the prescribed SFT,
generate the second CSI based on the first common RI if the second transmission time point is within the prescribed SFT or based on a second common RI configured according to a channel state of the second transmission time point if the second transmission time point is not within the prescribed SFT, and
transmit the second CSI to the at least one base station at the second transmission time point according to a second CSI feedback configuration.

* * * * *